United States Patent
Sequoia et al.

(10) Patent No.: US 10,474,479 B1
(45) Date of Patent: Nov. 12, 2019

(54) PREVENTING FRAMEWORK CONFLICTS FOR MULTI-OS APPLICATIONS

(71) Applicant: Apple Inc., Cupertino, CA (US)

(72) Inventors: Jeremiah R. Sequoia, Woodside, CA (US); Juergen Ributzka, San Jose, CA (US); Shengzhao Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/104,818

(22) Filed: Aug. 17, 2018

Related U.S. Application Data

(60) Provisional application No. 62/679,827, filed on Jun. 3, 2018, provisional application No. 62/679,829, filed on Jun. 3, 2018, provisional application No. 62/687,945, filed on Jun. 21, 2018.

(51) Int. Cl.
| | |
|---|---|
| *G06F 3/00* | (2006.01) |
| *G06F 9/46* | (2006.01) |
| *G06F 9/445* | (2018.01) |
| *G06F 8/41* | (2018.01) |
| *G06F 8/20* | (2018.01) |
| *G06F 9/54* | (2006.01) |

(52) U.S. Cl.
CPC .......... *G06F 9/44521* (2013.01); *G06F 8/20* (2013.01); *G06F 8/41* (2013.01); *G06F 9/541* (2013.01)

(58) Field of Classification Search
CPC ................................ G06F 9/541; G06F 8/20
USPC .......................................... 719/328; 717/100
See application file for complete search history.

(56) References Cited

U.S. PATENT DOCUMENTS

| | | | |
|---|---|---|---|
| 6,328,766 B1 * | 12/2001 | Long .................. | G06F 3/0626 360/131 |
| 8,291,078 B2 | 10/2012 | Fisher et al. | |
| 9,582,601 B2 | 2/2017 | D'Aurelio et al. | |
| 10,331,824 B2 * | 6/2019 | Dumont .............. | G06F 17/5022 |
| 2006/0136890 A1 * | 6/2006 | Jodh .................. | G06F 9/44521 717/163 |
| 2007/0234285 A1 | 10/2007 | Mendoza et al. | |

(Continued)

OTHER PUBLICATIONS

Donald E. Porter, Rethinking the Library OS from the Top Down, (Year: 2011).*

*Primary Examiner* — Lechi Truong
(74) *Attorney, Agent, or Firm* — Jaffery Watson Mendonsa & Hamilton LLP

(57) ABSTRACT

Embodiments described herein provide for system and methods to enable an operating environment that supports multi-OS applications. One embodiment provides for a non-transitory machine-readable medium storing instructions that cause a data processing system to perform operations to detect conflicts during a build process for a dynamic library, the operations comprising loading program code for the dynamic library to build for a first platform, determining a set of interfaces and data structures exported by the dynamic library for the first platform, determining a set of interfaces and data structures exported by the dynamic library for a second platform, parsing the set of interfaces and data structures to verify consistency of a build contract for the dynamic library, and generating a build error during a build process for the dynamic library upon detecting an inconsistent build contract specifying at least an application binary interface (ABI) for the dynamic library.

20 Claims, 19 Drawing Sheets

(56) References Cited

U.S. PATENT DOCUMENTS

2015/0074684 A1 3/2015 Goldstein et al.
2015/0193241 A1 7/2015 Hamzata

* cited by examiner

PREVENTING FRAMEWORK CONFLICTS FOR MULTI-OS APPLICATIONS

CROSS-REFERENCE

This application claims priority to U.S. Provisional Patent Application No. 62/679,827 filed Jun. 3, 2018, which is hereby incorporated herein by reference.

This application also claims priority to U.S. Provisional Patent Application No. 62/679,829 filed Jun. 3, 2018, which is hereby incorporated herein by reference.

This application also claims priority to U.S. Provisional Patent Application No. 62/687,945 filed Jun. 21, 2018, which is hereby incorporated herein by reference.

FIELD

Embodiments described herein relate generally to multi-platform applications and frameworks and, more specifically, to preventing framework conflicts for multi-OS applications.

BACKGROUND OF THE DESCRIPTION

The term platform as used in a computer context can refer to the type of processor and/or other hardware on which a given operating system or application program runs, the type of operating system on a computer or the combination of the type of hardware and the type of operating system running on that hardware. The terms cross-platform, multi-platform, or portable, can be used to describe operating systems and application programs that can run on more than one platform. Multi-platform operating systems can refer to operating systems that can be compiled or configured to run on multiple processor platforms. Multi-platform applications can refer to applications that can be compiled or configured to run on multiple processor platforms and/or multiple operating systems. In general, multi-platform software can be differentiated between platforms at compile time.

Applications or operating systems that are not multi-platform, in some instances, can be ported between platforms. Porting describes the development of a version of an application or an operating system originally designed for one platform such that the application or operating system can be used on other platforms. The portability of a software project can vary based on the differences between the origin and target platform. Porting a software project can involve changes to core program code, as well as libraries or applications associated with the program code. For example, if application programming interface (API) differences exist between platforms, some changes may be required to adapt the ported program to the API of the target platform. However, such changes may be difficult or time consuming for large codebases.

SUMMARY OF THE DESCRIPTION

Embodiments described herein provide for system and methods to enable an operating environment that supports multi-OS applications. Some embodiments provide techniques to enable frameworks to load within a multi-OS operating environment. Some embodiments provide techniques to prevent framework conflicts within a multi-OS operating environment.

One embodiment provides for a non-transitory machine-readable medium storing instructions which, when executed, cause one or more processors of a data processing system to perform operations to detect conflicts during a build process for a dynamic library, the operations comprising loading program code for the dynamic library to build for a first platform, determining a set of interfaces and data structures exported by the dynamic library for the first platform, determining a set of interfaces and data structures exported by the dynamic library for a second platform, parsing the set of interfaces and data structures to verify consistency of a build contract for the dynamic library, and generating a build error during a build process for the dynamic library upon detecting an inconsistent build contract, the build contract specifying at least an application binary interface (ABI) for the dynamic library.

One embodiment provides for a method of detecting conflicts during a build process for a dynamic library. The method comprises loading program code for the dynamic library to build for a first platform, determining a set of interfaces and data structures exported by the dynamic library for the first platform, determining a set of interfaces and data structures exported by the dynamic library for a second platform, parsing the set of interfaces and data structures to verify consistency of a build contract for the dynamic library, and generating a build error during a build process for the dynamic library upon detecting an inconsistent build contract, the build contract specifying at least an ABI for the dynamic library.

One embodiment provides for a data processing system comprising a memory to store instructions for execution and one or more processors to execute instructions stored in memory. The instructions, when executed, can cause the one or more processors to load program code for a dynamic library to build for a first platform, determine a set of interfaces and data structures exported by the dynamic library for the first platform, determine a set of interfaces and data structures exported by the dynamic library for a second platform, parse the set of interfaces and data structures to verify consistency of a build contract for the dynamic library, and generate a build error during a build process for the dynamic library upon detection of an inconsistent build contract, the build contract to specify at least an ABI for the dynamic library. The data processing system can also be configured to perform any method described herein. The data processing system can also be configured to execute instructions embodied in a machine readable medium, where the instructions perform operations described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Embodiments described herein provide for system and methods to enable an operating environment that supports multi-OS applications. One embodiment provides for techniques to enable frameworks to load within a multi-OS operating environment. One embodiment provides techniques to prevent framework conflicts within a multi-OS operating environment. Existing systems may require significant development effort before applications developed for a mobile platform can compile for execution on a different platform, and the application may not be able to interoperate with the runtime libraries of platforms other than the originally intended platform for the application. The concepts described herein provide improvements to the state of the computing arts by providing systems and methods to enable applications developed for a mobile platform to be recompiled for execution on non-mobile platforms with a limited number of modifications.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records but reserves all other rights whatsoever. Copyright© 2018, Apple Inc.

Figure 1:
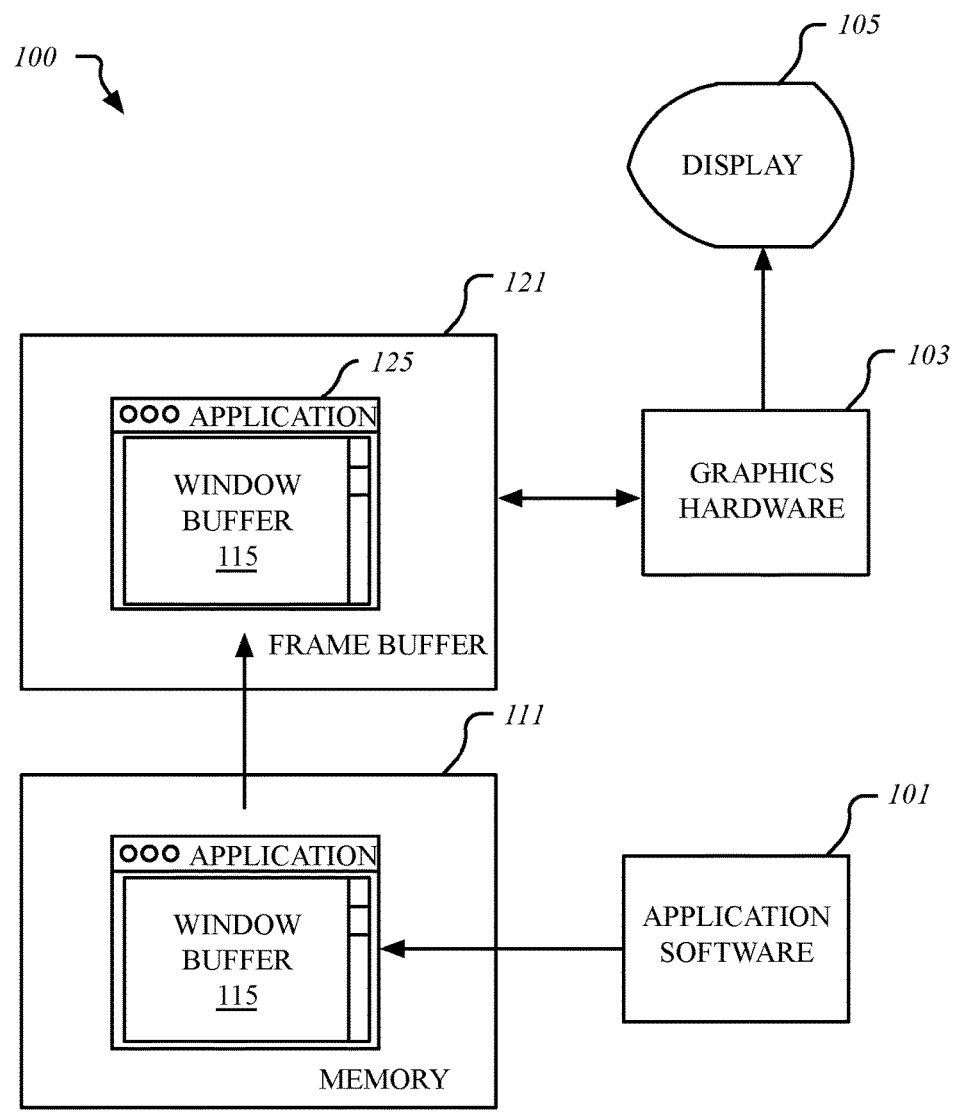
FIG. 1 illustrates a window system for a graphical interface.

FIG. 1 illustrates a window system 100 for a graphical interface. Application software 101 can draw content into window buffers. The window system can then combine the images buffered in window buffers in a frame buffer to display the corresponding windows on the screen. For example, application software 101 draws content in a window buffer 115 of an application window, which can be allocated in memory 111. A frame buffer 121 contains data for the screen image of the windows that are displayed on the screen of a display device 105 of a computing device. The frame buffer 121 is typically under control of graphics hardware 103 (e.g., a graphics processing unit) which controls the display of the window 125 on the screen of display device 105 using the data in the frame buffer. In some instances, the graphics hardware 103 can also draw into the window buffer 115 in response to commands provided to the graphics hardware by the application software 101.

Operations for creating the content in windows can be separated from operations for composing a screen image from images of windows for different applications. A variety of applications can create or update images of the windows and/or content for the windows in window buffers. A window system (e.g., window manager) can then compose a screen image from images of the windows in the various window buffers. The window buffers can be managed and drawn independently from the frame buffer. Content in the corresponding window buffers can be copied by the window system to the corresponding locations in the frame buffer to display the windows in these locations on the common screen of the display device.

Figure 2:
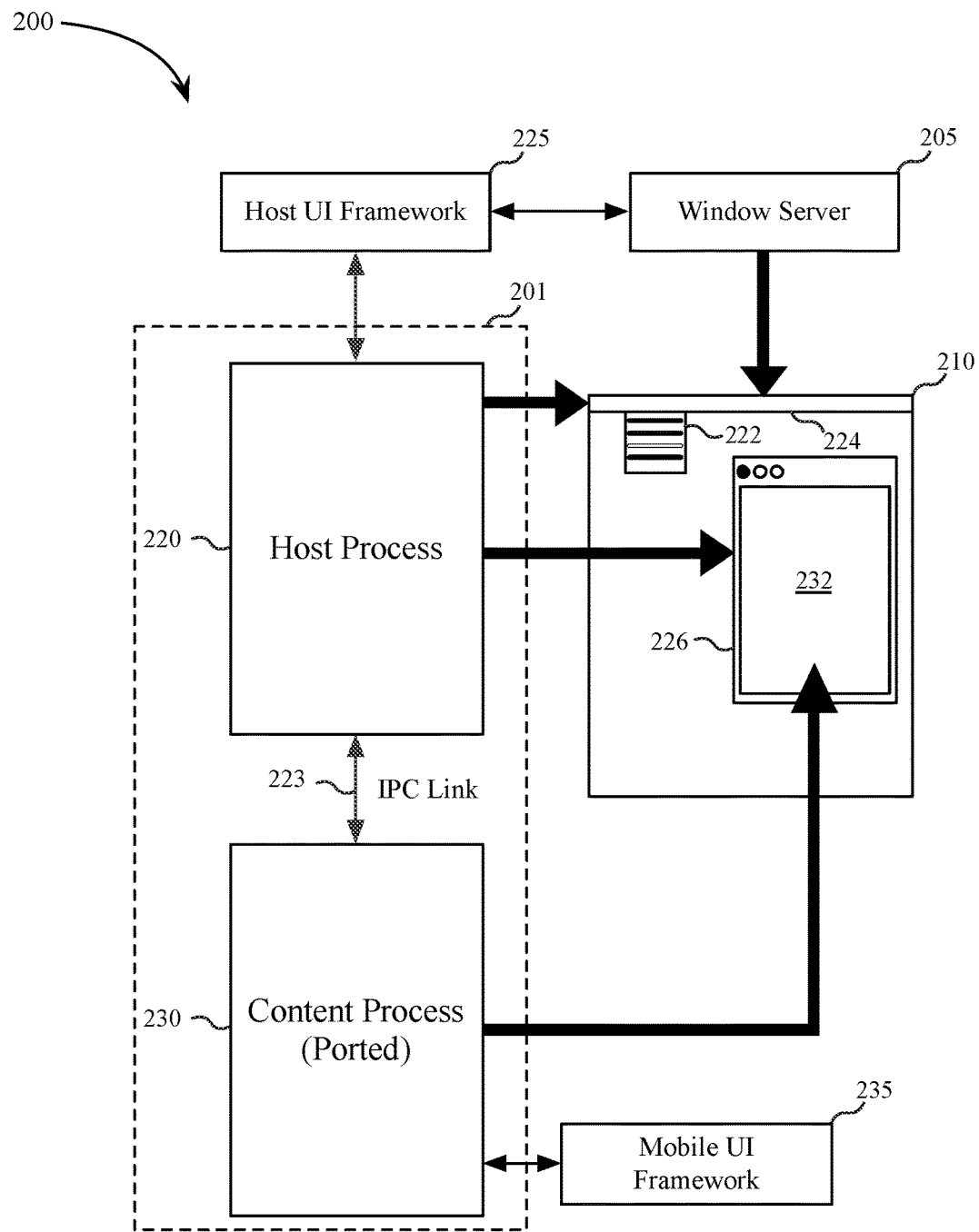
FIG. 2 illustrates a multi-process model to support porting applications to a different platform, according to an embodiment.

FIG. 2 illustrates a multi-process model 200 to support compiling applications for execution on multiple platforms, according to an embodiment. In one embodiment, the multi-process model 200 enables an application 201 to natively execute on an operating system and/or platform that is different from the operating system and/or platform for which the application was originally designed. The application 201 can be compiled for different platforms without requiring any significant modifications to the core program code of the application. The application 201 can execute as two or more processes, including a host process 220 and a content process 230. The content process can be linked against a variant of the original user interface (UI) framework of the application and the host process can be linked against the UI framework of the platform on which the application is to be executed. For example, in one embodiment program code for a mobile application that is designed for execution on a mobile platform can be compiled for execution on a laptop or desktop platform. The program code for the mobile application can be compiled to execute as the content process 230 and is linked against a mobile UI framework 235 for the mobile platform. During execution, the content process 230 can establish an inter-process communication link (IPC link 223) with the host process, which is linked against a host UI framework 225. The host UI framework 225 can provide access to user interface elements for the platform on which the application 201 executes. The IPC link 223 can be established via a variety of inter-process communication methods including, but not limited to sockets, pipes, ports, message queues, and shared memory. In one embodiment, the IPC link 223 is established via the XPC framework provided by Apple Inc. of Cupertino Calif. As described herein, a framework refers to one or more libraries that include objects, methods, data, and other information to facilitate various aspects of an application that is configured to execute on operating environments described herein. In other embodiments the IPC link 223, or an equivalent connection, can be established over a remote procedure call (RPC) connection. While the application 201 is illustrated as including two processes, the application 201 can include two or more processes to perform cross-platform operation. In one embodiment, the application 201 can be a composite of multiple applications, each application having multiple processes.

The host UI framework 225 and the mobile UI framework 235 can each provide objects used by the host process 220 and the content process 230 that are used to implement user interfaces on the respective platforms. The UI frameworks enable the generation and manipulation of windows, panels, buttons, menus, scrollers, and text fields, and the like, and handle the details to of the operations used to draw to a display, including communicating with hardware devices and screen buffers, clearing areas of the screen before drawing, clipping views, etc. However, the host UI framework 225 and mobile UI framework 235 have fundamental differences that should be addressed to enable a mobile application linked against the mobile UI framework 235 to execute correctly on the host platform. For example, some API calls, classes, and objects that serve similar functions differ between the mobile UI framework 235 and the host UI framework 225. Some functions, such as view animation, may differ between the mobile UI framework 235 and the host UI framework 225. Additionally, the mobile UI framework 235, in one embodiment, does not contain interfaces to manage the window server 205, which can be part of the operating system of the host (e.g., laptop, desktop, etc.) platform. Accordingly, the host UI framework 225 can interface with the window server 205 on behalf of the mobile UI framework 235. The host UI framework 225 can communicate with the window server 205 to scale windows, allocate memory buffers for windows, render into window buffers, and generally perform operations to display windows containing UI elements for the application 201.

In one embodiment the host process 220, via the host UI framework 225 and the window server 205, can generate and display a window frame 226, and menu bar 222, and status bar 224 on behalf of the content process 230. The content process 230 can then use the mobile UI framework 235 to create data objects and data for a window buffer 232 that contains content to be displayed for the application 201. Information to describe and/or reference the created data objects and data for the window buffer 232 can be relayed via the IPC link 223 to the host process 220. The host process 220 can use the host UI framework 225 to modify details of the graphical elements that make up contents of the status bar 224, menu bar 222, and window frame 226. The host process 220 can then automatically display the window buffer 232 created by the content process within the window frame 226.

In one embodiment, details for the graphical interface elements to be displayed by the host process 220 can be determined automatically based on metadata associated with the content process 230. For example, a title for the window frame 226 can be determined based on the name of the content process 230 or the name of the mobile application on which the content process 230 is based. Some graphical elements of the status bar 224 or menu bar 222 can also be automatically determined based on metadata associated with the content process 230, or information provided by the content process via the IPC link 223.

In one embodiment, details for the graphical interface elements to be displayed by the host process 220 are determined interactively with the content process 230. For example, one or more elements of the menu bar 222 that will be displayed by the host process 220 can be validated with the content process 230 before display. Elements that do not successfully validate can be grayed-out or otherwise marked as un-selectable when the menu bar 222 is displayed.

For embodiments described herein, exemplary mobile platforms from which applications can be ported include mobile phone, television set-top box, console gaming system, application enabled television, or tablet computing device platforms. In various embodiments, the mobile application code can be compiled and executed via binary translation or can be compiled for direct execution by the processor within the laptop or desktop platform. In some embodiments, a common development environment can be provided for the mobile, laptop, and desktop platforms. The common development environment can be configured to enable application code for a mobile application to be compiled for execution on the laptop and desktop platform without requiring modifications to the application code.

Figure 3:
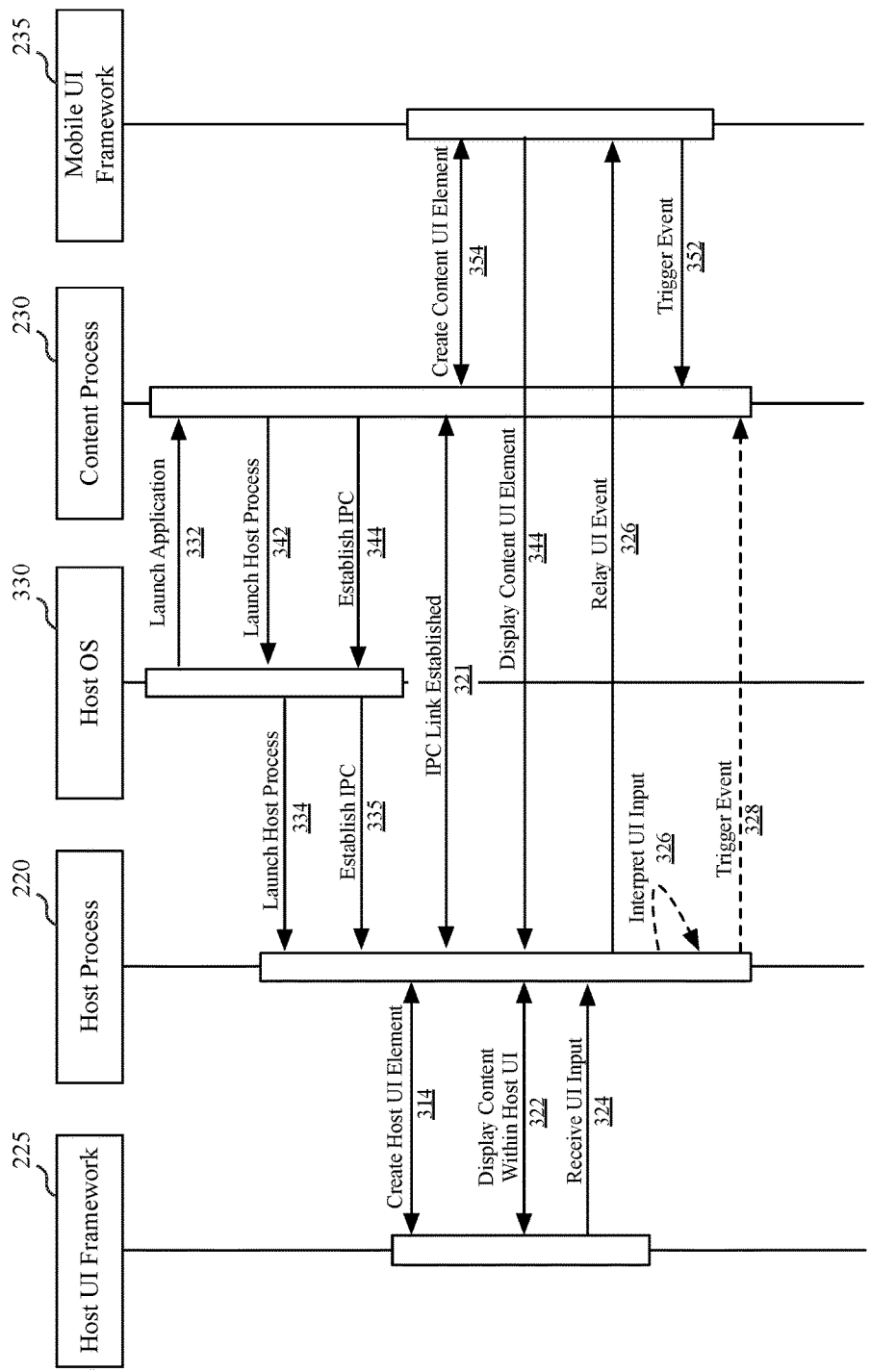
FIG. 3 is a sequence diagram that illustrates process, framework, and OS interaction for a multi-process model application provided by embodiments described herein.

FIG. 3 is a sequence diagram that illustrates process, framework, and OS interaction for a multi-process model application provided by embodiments described herein. A host operating system (host OS 330), in response to an application launch request, the host OS 330 can send a message 332 to launch a multi-process model application, which initially results in the launch of the content process 230. The content process can send a message 342 to the host OS 330 to launch the host process. The host OS 330 can then send a message 334 to launch the host process 220. In one embodiment the content process 230 can establish the IPC link (IPC link 223 of FIG. 2) by sending a message 344 to the host OS 330, which can send a message 335 to the host process, which causes the IPC link to be established at 321. In one embodiment the host OS 330 includes a process manager responsible for launching applications or processes. The process manager can manage the content process 230 and the host process 220 automatically upon launch of a multi-process model application that contains the processes.

The IPC link being established, the host process 220 can perform an operation 314 using the host UI framework 225 to create a host UI element, such as a window frame and status bar elements. The content process, via the mobile UI framework 235, can perform an operation 354 to create a content UI element. An operation 346 to display the content UI element is relayed via the IPC link to the host process 220, which can perform an operation 322 to display content within the host UI in conjunction with the host UI framework 225. For example, a pointer to a window buffer containing content to be presented by the application can be provided to the host process 220 via the IPC link, which can display the window buffer within the window frame created via the host UI framework 225.

In one embodiment the illustrated operations and messages are performed and transmitted transparently to the program code of the content process 230. IPC messages performed during execution of the mobile application on the host platform, via the content process 230, can be transmitted automatically by the host OS 330 and application frameworks, including the host UI framework 225 and mobile UI framework 235. The core program code of the mobile application can execute normally, without requiring the developer to have explicit knowledge of the operations of the host process 220 and host UI framework 225.

A multi-process application can handle UI events using a variety of techniques depending on the nature of the UI event. A host UI framework 225 can receive a UI event, such as a click event that will be processed by the content process 230. The host UI framework 225 can send a message 324 to program code of the host process 220 upon receipt of UI input. In one embodiment, the host process 220 can send a message 325 to relay the UI event to the mobile UI framework 235. In one embodiment, before the UI event is relayed, the specific type of UI event can be translated from a UI event associated with the host UI framework 225, such as a mouse click input, a touchpad input, or a multi-touch touchpad input, to a corresponding input event for the mobile UI framework 235, such as a touchscreen event or a multi-touch touchscreen event. The mobile UI framework 235 can then send a message 352 to trigger the appropriate software event at the content process 230. In one embodiment, the host process 220, upon receipt of the message 324 regarding the UI input, can perform an operation 326 to interpret the UI input. The host process 220 can then send a message 328 directly to the content process 230 to trigger the appropriate software event. Additionally, some inputs may be handled directly by the host process 220 or the host UI framework 225. For example, a UI input to minimize the window in which the application is executed can be handled directly by the host UI framework 225.

Leveraging Simulator Components to Enable Multi-OS Applications

A host platform can execute a development environment in which mobile applications can be simulated to facilitate application development. In one embodiment, elements of the mobile application simulator can be leveraged to enable mobile applications to execute on the host environment by configuring the support libraries of the simulator to work outside of the simulator environment.

Figure 4A:
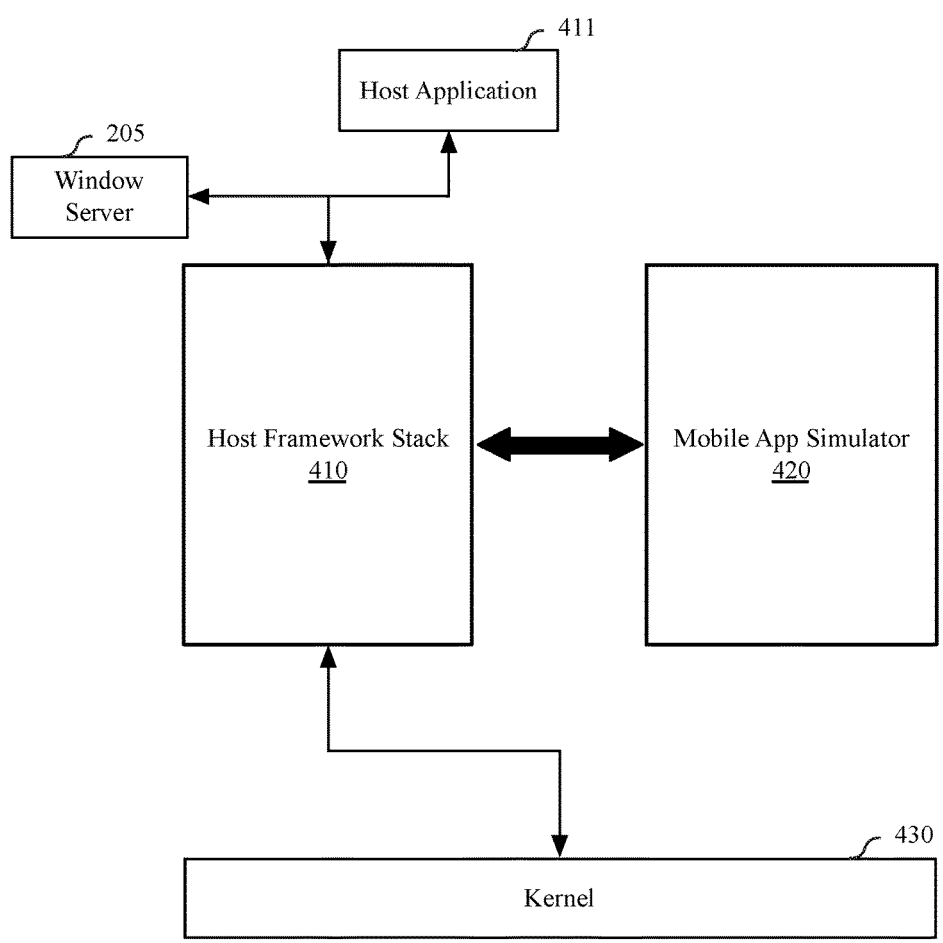
FIG. 4A-4C illustrate host operating environments according to embodiments described herein.
Figure 4B:
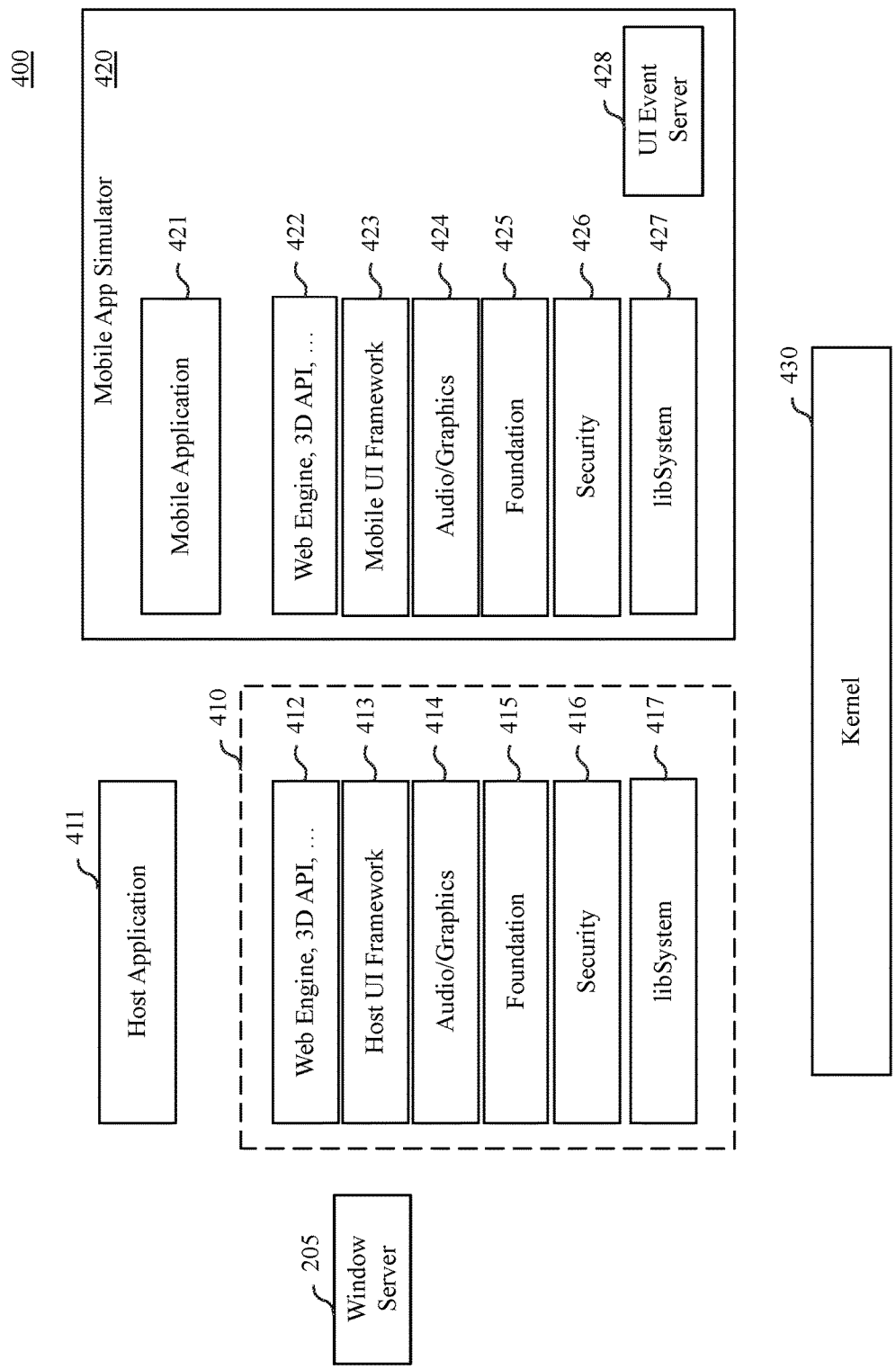
Figure 4C:
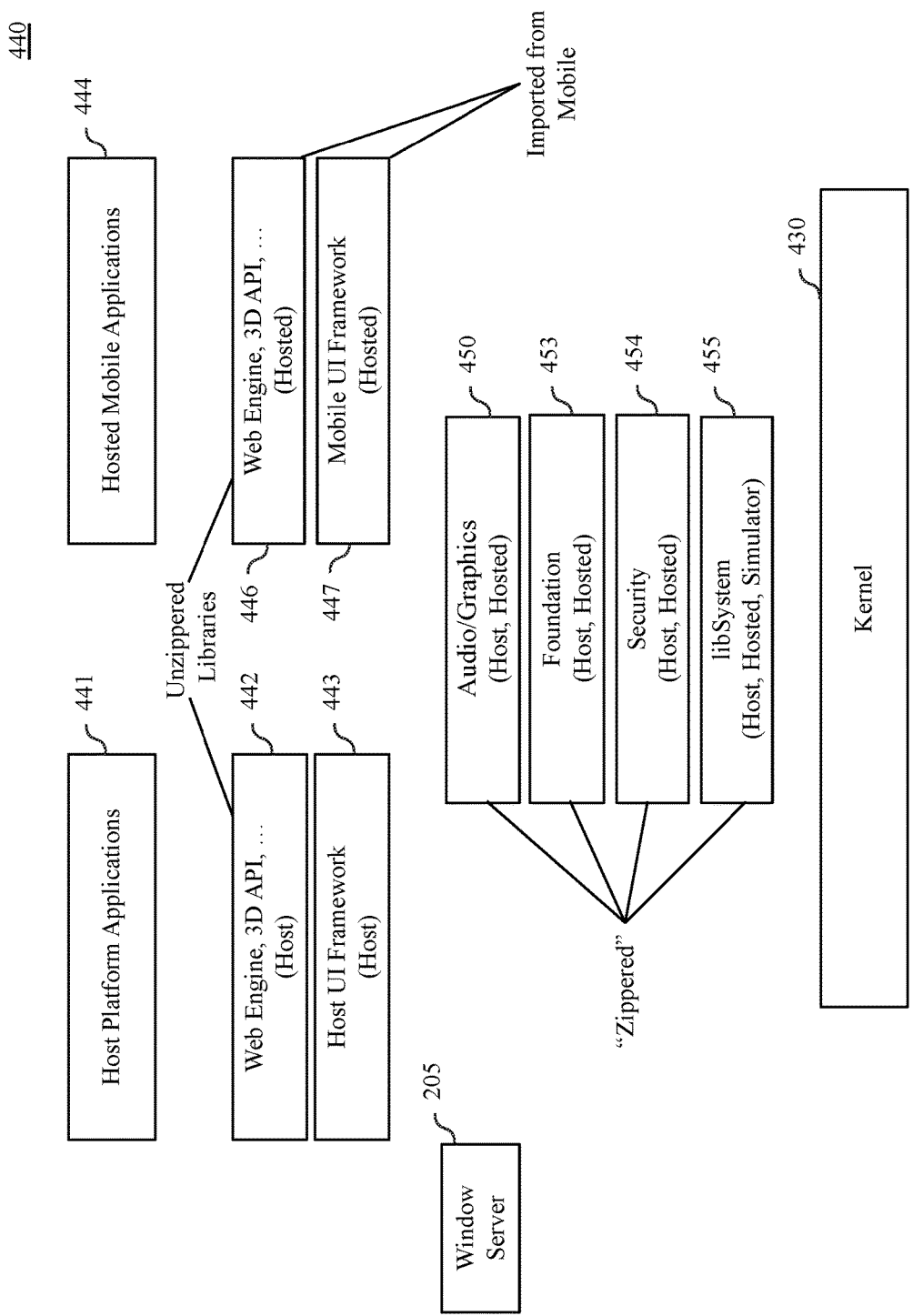

FIG. 4A-4C illustrate a host operating environments 400, 440, according to embodiments described herein. The host operating environments 400, 440 can reside on a laptop or desktop computing environment as described herein. Host operating environment 400 of FIG. 4A-4B include a mobile application simulator 420 to simulate a mobile electronic device. The mobile application simulator 420 can be used to assist a developer in the development mobile applications for a simulated mobile electronic device. Alongside the mobile application simulator 420, host operating environment 400 can also execute a host application 411, such as an application configured to execute on a desktop or laptop platform. Host operating environment 440 of FIG. 4C illustrate an operating environment that can directly support execution of a mobile application, such as an application that could be simulated in the mobile application simulator 420 of FIG. 4A-4B.

As shown in FIG. 4A, host operating environment 400 can include a host framework stack 410 that facilitates the execution of the host application 411 and the mobile application simulator 420. The host application 411 can be any example application that is compiled for execution on the host environment. For example, the host application can be similar to the host process 220 of FIG. 2, although the host process 220 is configured specifically to facilitate the execution of the content process 230 of FIG. 2. The host application 411 leverages multiple libraries, frameworks, and daemons within the host framework stack 410, which can include a host UI framework, such as host UI framework 225 of FIG. 2-FIG. 3, to facilitate the display of UI content via the window server 205. The host framework stack 410 can communicate with a kernel 430, which is an operating system kernel of the host operating environment. The kernel 430 is responsible for the low-level operations of host operating environment 400 and includes logic to enable direct communication with the underlying hardware of the host platform.

FIG. 4B shows a more detailed view of host operating environment 400, according to an embodiment. Host operating environment 400 can include a host framework stack 410 having high-level libraries 412 (e.g., web engine, 3D API), a host UI framework 413, audio and graphics framework 414, a foundation framework 415, a security framework 416, and a system library 417 (e.g., libSystem). API calls and events handled by the host framework stack 410 can ultimately be serviced in some form by the kernel 430, which mediates access to the underlying hardware on which host operating environment 400 executes. The detailed view of host operating environment 400 shown in FIG. 4B is illustrative of some embodiments but is not limiting as to all embodiments. Other embodiments can provide differing layers of software libraries and frameworks that perform similar functionality as the illustrated host framework stack 410, as in the host operating environment 400 as a whole.

In one embodiment, the host application 411, which can be a desktop or laptop application, can execute using a framework and library stack that facilitates access to system resources. High-level libraries 412 can enable functionality for application components such as a web engine (e.g., WebKit), a 3D API, and other client UI libraries, daemons, or utilities. For example, the high-level libraries 412 can enable 3D graphics applications to perform 3D rendering via 3D API known in the art, such as Metal, OpenGL, Vulkan, and other 3D APIs. The high-level libraries 412 can also enable general-purpose compute operations via Metal, OpenCL, and other APIs having support for general-purpose GPU compute operations.

A host UI framework 413 provides objects used to implement the user interface for a host application, such as windows, panels, buttons, menus, scrollers, text fields, and the like. The host UI framework 413 handles the drawing details of a host application user interface, including communicating with hardware devices and screen buffers. The host UI framework 413 can facilitate the drawing of UI elements to be displayed via the window server 205. Some of the underlying functionality of the host UI framework 413 can be provided via the audio and graphics framework 414. The audio and graphics framework 414, in one embodiment, includes an audio framework that provides software interfaces for implementing audio features in applications and a graphics framework to perform accelerated 2D rendering, with 3D rendering enabled via high-level libraries 412.

The foundation framework 415 is a framework that provides a base layer of functionality for applications and higher-level frameworks, including data storage and persistence, text processing, date and time calculations, sorting and filtering, and networking. The foundation framework 415 can also enable inter-process communication between application processes and system daemons that execute on the host platform. Generally, foundation framework 415 refers to any type of framework or library suite that provides baseline functionality for an application and/or high-level frameworks and is not specifically limited to the Foundation framework provided by Apple Inc. of Cupertino Calif.

The security framework 416 can be used to protect information, establish trust, and control access to software. The security framework 416 can be used to establish a user's identity (authentication) and then selectively grant access to resources (authorization). Additionally, the security framework 416 provides cryptographic routines that can be used to secure data stored on the host platform, as well as data that is transmitted across a network connection. The security framework 416 can also be used to ensure the validity of code to be executed for a particular purpose and can be used to examine and validate signed code that executes on the host platform.

The system library 417 (e.g., libSystem), in one embodiment, combines multiple elements of core library functionality into a single library. The system library 417 can provide core library functionality including but not limited to the standard system runtime (e.g., libC), math library, thread libraries, process control libraries, and the like.

In one embodiment the mobile application simulator 420 can execute a mobile application 421 within the host operating environment 400 by using an enclosed implementation of the library and framework stack used by the mobile application 421 when executing on a mobile platform. The mobile application simulator 420 can include, for example, high-level libraries and frameworks 422 (e.g., web engine, 3D API), a mobile UI framework 423, audio and graphics framework 424, a foundation framework 425, a security framework, and a system library 427 (e.g., libSystem). The mobile application simulator 420 additionally includes a UI event server 428, which can handle simulated UI events for the mobile application simulator 420.

In one embodiment, the mobile application simulator 420 can enable communication between libraries and frameworks of the simulator environment with the corresponding libraries and frameworks of the host framework stack 410. In one embodiment, some aspects of the mobile application simulator 420 are fully self-contained. In one embodiment, at least some of the libraries and frameworks of the mobile application simulator translate and relay calls, messages, events, etc., received from the mobile application 421 to the host framework stack 410.

This detailed view of host operating environment 400 is illustrative of one embodiment, but is not limiting as to all embodiments, as other embodiments can provide differing layers of software libraries and frameworks that perform the functionality required to enable at least minimal application functionality in a simulated environment. Specifically, one skilled in the art will recognize that the mobile application simulator 420 will be configured to address differences in the operating environment between the mobile application 421 and host operating environment 400. For example, in one embodiment the UI event server 428 can handle simulated UI events that may not be supported by the host framework stack 410, such as touch events or can inject simulated sensor events, such as accelerometer sensor data to trigger orientation changes.

In one embodiment, some architectural aspects of the mobile application simulator 420, or a variant thereof, can be leveraged to provide a variant of the host operating environment 400 in which at least a subset of mobile applications can be executed outside of the simulator environment.

FIG. 4C illustrates a host operating environment 440 that can directly support execution of a mobile application. In one embodiment, hosted mobile applications 444 can be based on program code that can alternately be compiled to execute on a mobile platform or as a hosted application that can execute within the host operating environment 440. When compiled for hosted execution, hosted mobile applications 444 can execute alongside host platform applications 441 that are designed and compiled for execution on the host operating environment 440. The hosted mobile applications 444 can be executed without the use of a hypervisor or other virtualization technologies. In one embodiment, some of the mobile functionality can be enabled by integrating some of the support provided to simulated mobile applications into the libraries and frameworks that are available to all applications executing on the host operating environment 440. Support can be integrated such that hosted mobile applications are fully hardware accelerated.

In one embodiment the host operating environment 440 can include versions of the libraries and frameworks of the host framework stack 410 of FIG. 4A-4B that are extended to include functionality used by host platform applications 441 and hosted mobile applications 444. Such libraries and frameworks can be described as zippered. Some libraries and frameworks of the host framework stack 410 cannot be combined with corresponding libraries that perform similar functionality due to API incompatibilities or other incompatibilities between the libraries. Accordingly, multiple instances of those libraries (e.g., unzippered libraries) can reside in the host operating environment 440, with one instance provided for use by host platform applications 441 and a second instance provided for use by hosted mobile applications 444. The specific details of which libraries fall into which category can vary across embodiments. In general, embodiments described herein provide systems and methods by which a build environment, linker, and loader for the host operating environment can be configured to support the various classifications of libraries and frameworks that would reside in a host operating environment that supports multi-OS applications.

As shown in FIG. 4C, exemplary zippered libraries and frameworks include an audio/graphics framework 450, a foundation framework 453, a security framework 454, and a system library 455 (e.g., libSystem). The zippered libraries and frameworks provide a superset of functionality accessed by host platform applications 441 and hosted mobile application 444. Exemplary unzippered libraries and frameworks include high-level libraries and frameworks 442, 446 (e.g., web engines, 3D APIs) that provide similar functionality, but have incompatibilities and prevent integration. Additional unzippered libraries and frameworks include the host UI framework 443 and the mobile UI framework 447, which can each generate content for display via the window server 205.

The illustrated libraries and frameworks of host operating environment 440 can be dynamic libraries with multiple versions, with some versions that can be compiled for a mobile platform, other versions that can be compiled for a host (e.g., desktop/laptop) platform, and still other versions that can be compiled to provide functionality to mobile applications that are compiled for execution on the host operating environment. Where multiple instances of a library can reside on the host operating environment 440, it becomes important to be able to differentiate between different instances of the same library, particularly when the different instances indicate the same processor architecture.

Annotating Dynamic Libraries

In previous system implementations, where mobile platforms and host platforms used different processor architectures, differentiation between multiple versions of dynamic libraries could be made based on the processor architecture. Where a dynamic library was labeled as being compiled for the processor architecture of a mobile platform, the load of that library could be limited to the mobile platform. Where mobile applications can be compiled for execution on either a mobile platform or for execution on a host operating environment, it no longer becomes feasible to use processor architecture as a key differentiator. Embodiments described herein provide techniques to annotate dynamic libraries, such that libraries used by hosted mobile applications can be properly loaded by the host operating environment on which the mobile application executes.

As shown in FIG. 4C, libraries, and frameworks can be annotated to explicitly indicate which of multiple possible platforms on which variants of the library can be loaded. Libraries that are imported from a mobile platform can be annotated at build time to indicate whether those libraries are hosted versions of those libraries or mobile versions of those libraries. Libraries that are intended to be loaded on a mobile platform can be marked explicitly as mobile libraries, while libraries that will execute on a host platform, for example, on host operating environment 440, can be annotated to include information to identify those libraries as hosted libraries. Such annotation can be used to enable a dynamic library loader of the host operating environment 440 to safely load the appropriate libraries for hosted mobile applications 444. Versions of unzippered libraries or frameworks that are to be used by host platform applications 441 can be annotated as host platform libraries or frameworks. In one embodiment, some zippered libraries that contain both host and mobile functionalities can also be annotated as suitable for loading by host applications and libraries as well as applications and libraries used to support hosted mobile applications 444. Furthermore, some libraries, such as the system library 455, can be annotated for use by a variety of libraries and programs, such as host libraries, hosted libraries, and simulator libraries and applications. A variety of annotation techniques can be employed to indicate a target platform for a library or framework. In one embodiment, the annotation is performed by adding a field to the object data that can specify one or more target platforms for the library file or framework files.

Figure 5:
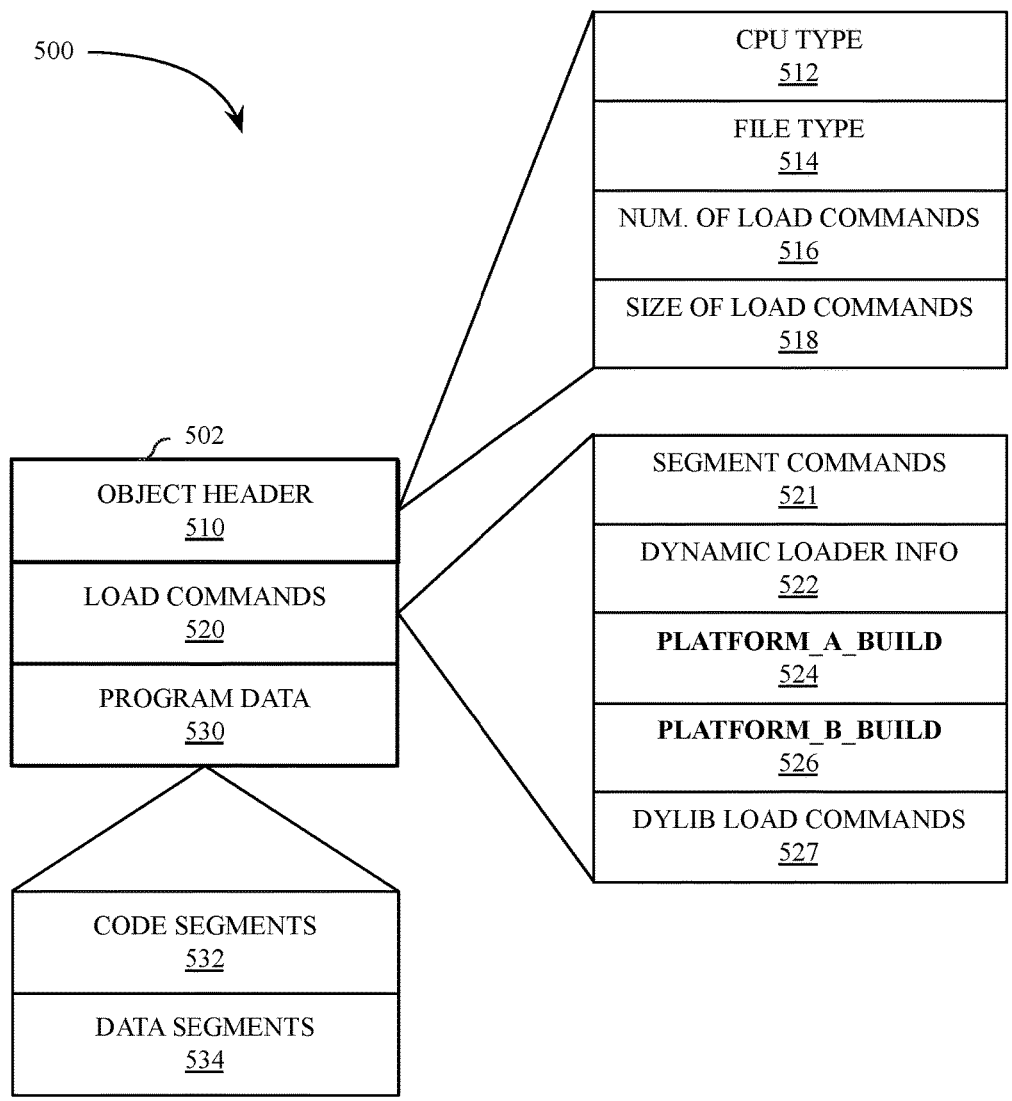
FIG. 5 illustrates an object file format that can contain dynamic library annotations, according to an embodiment.

FIG. 5 illustrates an object file format 500 that can contain dynamic library annotations, according to an embodiment. The illustrated object file format 500 is exemplary of one embodiment, but is not limiting as to all embodiments, as the specific details can vary. In one embodiment, an object file 502 can have an object header 510, load commands 520, and program data 530. The object header 510 can include general information about the object file 502. The load commands 520 specify the logical structure of the object file 502 and the layout of the file in virtual memory. The program data 530 includes the raw data for code segments 532 and data segments 534 that are defined in the load commands 520.

In one embodiment, the object header 510 includes data such as, but not limited to the CPU type 512, file type 514, number of load commands 516, and the size of those load commands 518. The CPU type 512 can specify the processor architecture (e.g., x86_64, arm64, etc.) for which the object file 502 is compiled. The file type 514 can specify whether the file is an executable file, an object file, or a library file (e.g., dynamic/shared library file). The number of load commands 516 specify the number of load commands in the set of load commands 520. The size of load commands 518 indicates the size of the set of load commands 520.

The load commands 520 include data such as, but not limited to segment commands 521, dynamic loader information 522, and dynamic loader commands 527. In one embodiment the load commands 520 also include one or more platform build commands that specify one or more target platforms on which the object file 502 can be loaded. Historically, one and only one platform could be identified or else the object file would be considered malformed. Additionally, the CPU type 512 previously could be considered a valid indicator of the target platform for an object, executable, or library file. For multi-OS platforms as described herein, the historical indicators are no longer valid.

Embodiments described herein enable multiple platforms to be specified, particularly for dynamic libraries that can be loaded by programs that execute in a multi-OS environment. For example, the illustrated object file 502 can include a platform_A_build command 524, which is a load command that specifies that the object file can be loaded for an application that executes on platform A, which can be, for example, a host platform. The illustrated object file 502 can also include a platform_B_build command 526 that specifies that the object file can be loaded for an application that executes on platform B, which can be, for example, a hosted mobile application platform that enables mobile applications to execute on the host platform. For example, the platform build commands can be used to indicate that the zippered libraries of FIG. 4C can be loaded by host platform applications 441 or hosted mobile applications 444. In one embodiment, the platform build commands can also specify a minimum platform version for which the illustrated object file 502 can be loaded, for example, to exclude previous versions of operating systems that do not support hosted execution of mobile applications.

Figure 6:
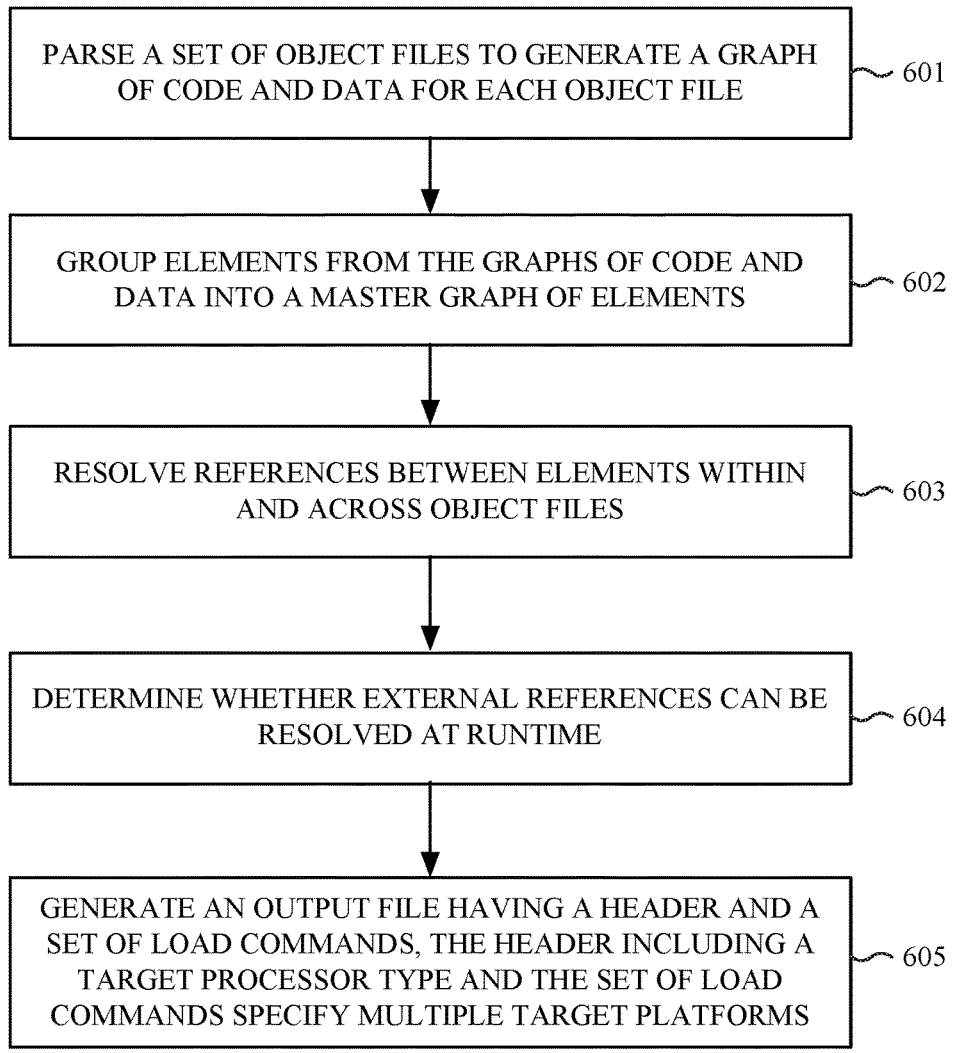
FIG. 6 illustrates a method by which a linker can annotate dynamic library files with target platform information, according to an embodiment.

FIG. 6 illustrates a method 600 by which a linker can annotate dynamic library files with target platform information, according to an embodiment. In previous system implementations, the loading of a dynamic library on a platform could be gated based on information such as CPU architecture. The illustrated method 600 provides explicit commands that can be included in a dynamic library file format that specifies which of multiple available platforms the dynamic library can be loaded. Method 600 can be performed by an application development system, such as an integrated development environment or modular compilation system, while building a dynamic library to be loaded for multiple execution environments as described herein.

In one embodiment, method 600 includes operation 601 to parse a set of object files to generate a graph of code and data for each object file. The graph of code and data can be used to determine relationships between individual elements of program code. Method 600 further includes operation 602 to group elements from the graphs of code and data into a master graph of elements. The master graph of elements is a graph that includes a superset of all graphs generated for the individual object files. The master graph of elements can be used to determine whether duplicate elements exists within the combined object files. One or more nodes of the various graphs generated from the various object files can be coalesced into a single node within the master graph of elements, where the coalesced nodes reference the same symbol or data. For example, identical constants that are referenced in multiple object files can be coalesced.

Method 600 additionally includes operation 603 to resolve references between elements within and across the set of object files, to ensure each reference to static libraries can be resolved at compile time. The method 600 further includes operation 604 to determine whether external references can be resolved at runtime. In one embodiment, the method 600 includes operation 605 to generate an output file having a header and a set of load commands, where the header includes a target processor type and the set of load commands specify multiple target platforms. In one embodiment the multiple target platforms include a host platform and a hosted mobile platform as described herein. In one embodiment the multiple target platforms can additionally include a simulator platform to enable execution of a mobile application in a simulated environment.

Figure 7:
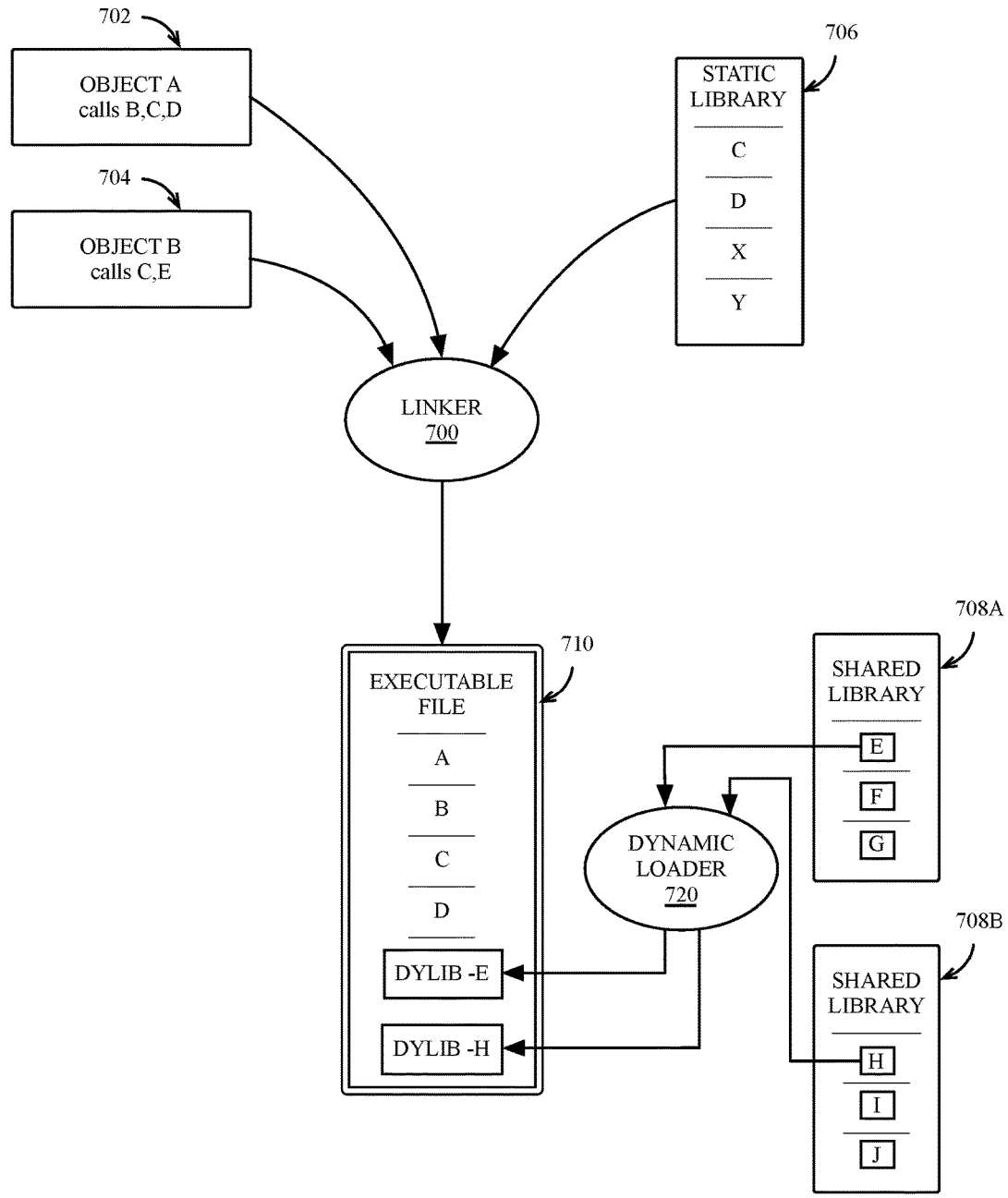
FIG. 7 is a block diagram illustrating a linking and loading process, according to an embodiment.

FIG. 7 is a block diagram illustrating a linking and loading process, according to an embodiment. In one embodiment, the linker 700 generates an executable file 710 to run on a data processing system by combining binary object files (e.g., object A 702, object B 704) and any statically linked libraries (e.g., static library 706). At a later point, such as when the executable file is loaded for execution, or dynamically during runtime, a dynamic loader 720 can perform operations to replace the dynamic library stubs that are included in the executable file 710 with a reference by which the executable file 710 may indirectly call functions in dynamic shared libraries 708A-708B.

For example, object A 702 and object B 704 are compiled object files that are the output of a compiler process, which converts high-level instructions into binary data that can be executed by the data processing system. Object A 702 includes function calls to function B stored in object B 704, as well as calls to functions C and D, which are stored in a static library 706. Object B 704 includes calls to function C in the static library 706 and a call to function E in shared library 708A. The linker 700 can resolve symbolic references to functions within object A 702, Object B 704, and the static library 706 at initial link time to create the executable file 710. However, the reference to function E is a stub reference that can be resolved at run time by the dynamic loader 720 to enable an indirect call to function E in the shared library 708A. The reference to function H is also a stub reference that can be resolved at run time by the dynamic loader 720 to enable an indirect call to function H in the shared library 708B.

In the context of multi-OS applications as described herein, it may be possible that shared library 708A and/or shared library 708B include different variants of functions and objects, where one variant is for use by host platform applications and another variant is for use by mobile platform applications that are executed on a host platform (e.g., hosted applications). When a shared library is dynamically loaded, the dynamic loader 720 can perform operations to verify that the shared library can be correctly loaded on the platform of the application associated with the executable file 710.

In one embodiment, a shared library that can be compiled for multiple platforms may include a unified code path that executes on each platform for which the library can be compiled. For example, shared library 708A and/or shared library 708B can be a shared library that is loaded by executables of multiple platforms. In previous systems, a shared library would be specific to a platform, thus platform differentiation could have been performed using build time determinations. During compile, sections of program code would be marked as relevant to a specific platform. The output file would then be marked as loadable only for a specific platform.

In embodiments described herein, shared libraries 708A-708B can be loaded by different platforms. Accordingly, program logic within a shared library can implement runtime platform differentiation to tailor program operations for specific application environments. Using runtime platform differentiation, a single shared library can exhibit different behavior depending on the platform of the executable program for which the shared library is loaded. In one embodiment, runtime platform determination can be performed directly by the program code of the library. For example, a per-platform instance of a shared library can be loaded in memory, with a different instance of the shared library loaded into memory for each supported platform. In one embodiment, runtime platform differentiation is performed via a call to a system API, which can return an indicator for the platform for which the shared library is currently loaded. In such embodiment, processes of applications for multiple platforms can bind to a single instance of a shared library that has been loaded into in memory. In some embodiments, a combination of these techniques can be implemented.

Figure 8A:
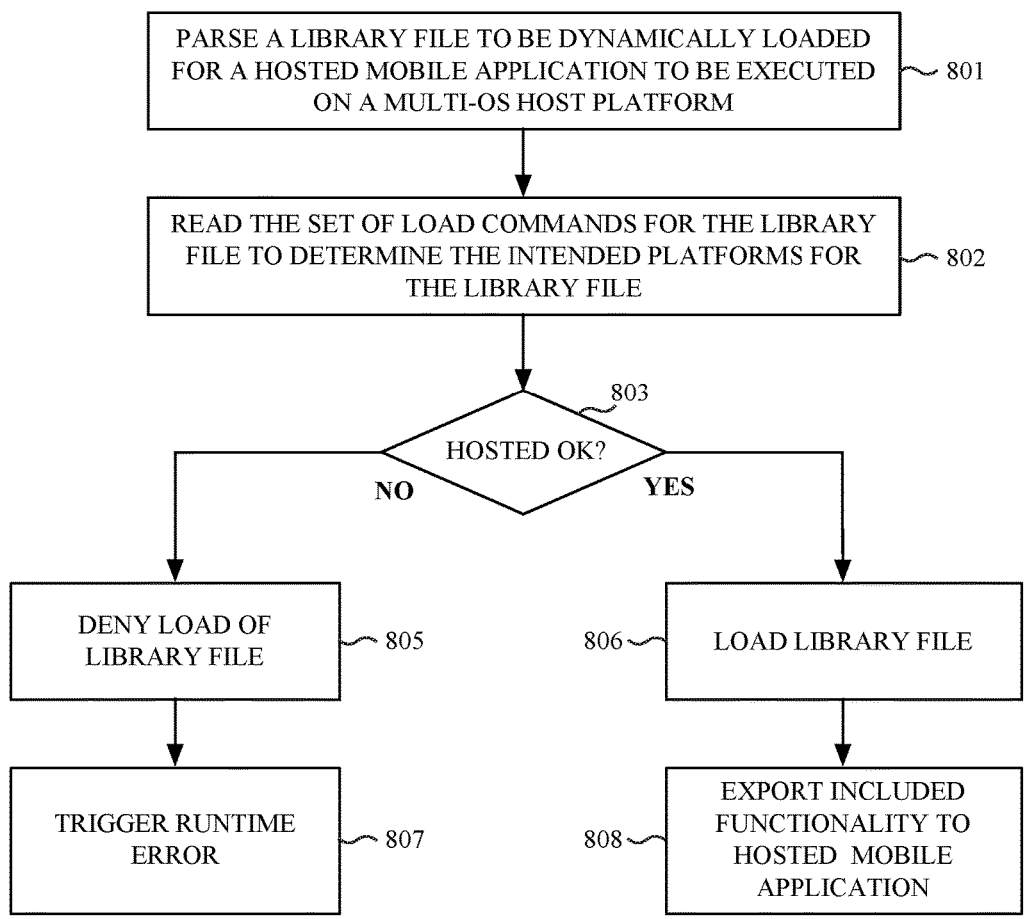
FIG. 8A-8B is are flow diagrams of methods to load and execute an annotated dynamic library for a mobile application executing on a host platform, according to an embodiment.
Figure 8B:
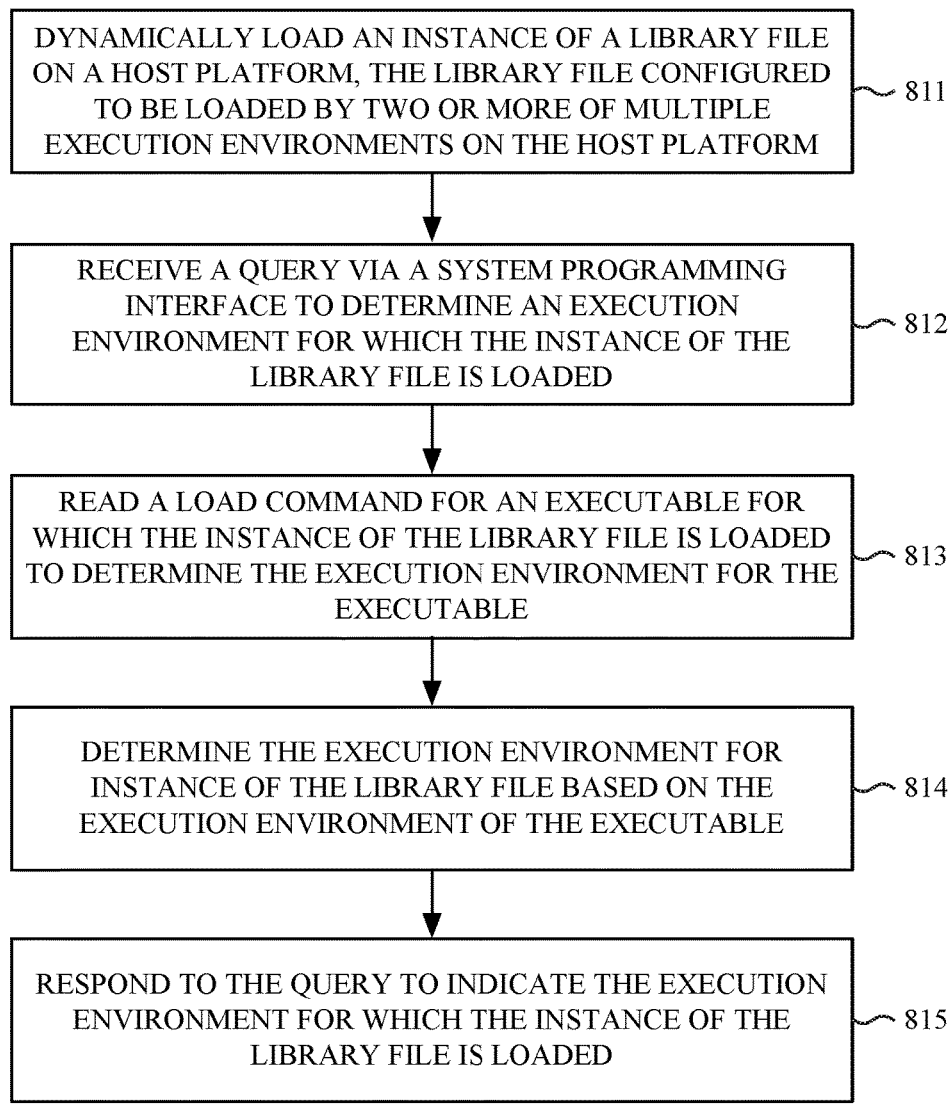

FIG. 8A-8B are flow diagrams of methods 800, 810 to load and execute an annotated dynamic library for a mobile application executing on a host platform, according to an embodiment. The method 800 of FIG. 8A can be implemented by a dynamic loader, such as dynamic loader 720 in FIG. 7, to determine whether a library file should be loaded within a host operating environment. The method 810 of FIG. 8B can be implemented by a dynamic library during execution on the host operating environment to perform runtime platform differentiation.

In one embodiment, the method 800 of FIG. 8A includes operation 801 to parse a library file to be dynamically loaded for a hosted mobile application to be executed on a multiple operating system (OS) host platform. The library file can be parsed to locate a set of load commands included within the library file. In one embodiment the multiple operating system host platform can be configured to execute applications of multiple operating systems. While not all embodiments are so limited, in some embodiments the host platform can present multiple types of operating environments that are associated with one or more related operating systems. The multiple related operating systems, in one embodiment, include a desktop or laptop operating system, a mobile operating system, an embedded operating system, or a simulation environment for any of these operating systems. The multiple operating systems can be related via a variety of factors including, but not limited to being derived from a related codebase or sharing one or more kernel components. For example, one embodiment enables execution of applications designed for the iOS operating system to be executed on the Mac OS operating system, each provided by Apple Inc. of Cupertino Calif.

In one embodiment the method 800 performs operation 802 to read the set of load commands for the library file to determine the intended platforms for the library file. If the dynamic loader determines that the load commands for the library file indicate that the library can load for a hosted mobile application, method 800 can perform operation 806 to load the library file. The method additionally includes operation 808 to export functionality included in the dynamic library to the hosted mobile application.

If, at block 803, the dynamic loader determines that the library file is not allowed to load for a hosted mobile application, the method 800 can perform operation 805 to deny the load of the library file. In one embodiment, after denying the load of the library file, method 800 proceeds to operation 807 to trigger a runtime error. The runtime error can indicate that a library specified for an executable cannot be loaded for the particular build of the executable.

In one embodiment, the method 810 of FIG. 8B includes to perform operation 801 to dynamically load an instance of a library file on a host platform including multiple execution environments. The library file is configured to be loaded by two or more of the multiple execution environments on the host platform. In one embodiment the library file is configured to be loadable by two or more execution environments via multiple platform load commands within the object file of the library.

The method 810 additionally performs operation 812 to receive a query via a system programming interface to determine an execution environment for which the instance of the library file is loaded. In one embodiment the system programming interface includes a system call that enables the library to determine a specific operating environment for which the instance of the library file is loaded. In one embodiment, the system programming interface includes a system call that enables the library to determine whether a library file is loaded for a specific operating environment.

The method 810 performs operation 813 to read a load command for an executable for which the instance of the library file is loaded to determine the execution environment for the executable. In one embodiment, while library files can be configured to be loaded for multiple platforms, operating systems, and/or operating environments, an executable file is configured (e.g., compiled for) only one of the available systems (e.g., platforms, operating systems, and/or operating environments). The load commands for the executable file can include a load command that specifies the system for which the executable is compiled. Libraries loaded by the executable file, in one embodiment, are configured to execute on the same system as the executable. Thus, the method 810 can perform operation 814 to determine the execution environment for the instance of the library file based on the execution environment of the executable. The method 810 can then respond to the query at operation 815 to indicate the execution environment for which the instance of the library file is loaded.

Runtime differentiation between platforms, operating systems, and/or operating environments can be used to tailor library operations for the executable that has loaded the library. For example, a user may have thousands of fonts installed on a computing system. However, not all the fonts may be relevant for a mobile application that is executing on the computing system. In one embodiment, the system font framework can be asked specifically about fonts that are available in the context of a mobile application. The system font framework can then return a smaller list of fonts compared to when the framework is referenced in the context of a laptop or desktop application.

In one embodiment, a lower level library or framework can perform a runtime determination of an execution environment to determine which version of an object or data file should be provided to a higher-level library. For example, a variant of the foundation framework described herein can be a zippered framework that can be loaded for multiple platforms. The foundation framework, depending on the platform, may interoperate with a mobile UI framework, a host UI framework, or another UI framework, such as a UI framework for a simulator environment. The library instances loaded for the foundation framework can use runtime differentiation to determine which object versions to provide to those higher-level frameworks. One of many examples is the attributed string feature provided by the Foundation framework as provided by Apple Inc. of Cupertino Calif. Applications that execute for different execution environments on the host platform may will expect different data types to define parameters such as color and font. Runtime differentiation can be used to determine the different data types to provide in such instances.

Preventing Framework Conflicts for Multi-OS Applications

One embodiment described herein provides techniques to prevent framework conflicts within a multi-OS operating environment. Where the same API is provided by a host operating environment for host platform applications and hosted mobile applications, it can be possible for runtime conflicts to arise that may not be detected via the normal build process. It may not be sufficient to simply ensure that symbol names match between applications and dynamic libraries for system frameworks. Additional operations can be performed to ensure binary incompatibility does not arise between different views of a framework when the framework is compiled for different platforms. Build-time logic can be applied to ensure the input and output of functions and methods provided by frameworks match across multiple platforms, as subtle differences between mobile and hosted functions may initially go unnoticed by a developer, resulting in unexpected behavior at runtime. For example, a time of day API provided by a framework may accept the same input parameters but, unknown to the developers of the framework, may output a local time for a first platform and coordinated universal time (UTC) for a second platform. In one embodiment, a signature analysis technique can be applied to generate signatures for functions and data structures exported by dynamic libraries to ensure that libraries compiled for different platforms do not contain differences that create binary conflicts between the different views of the library, at least within the same library version.

Figure 9A:
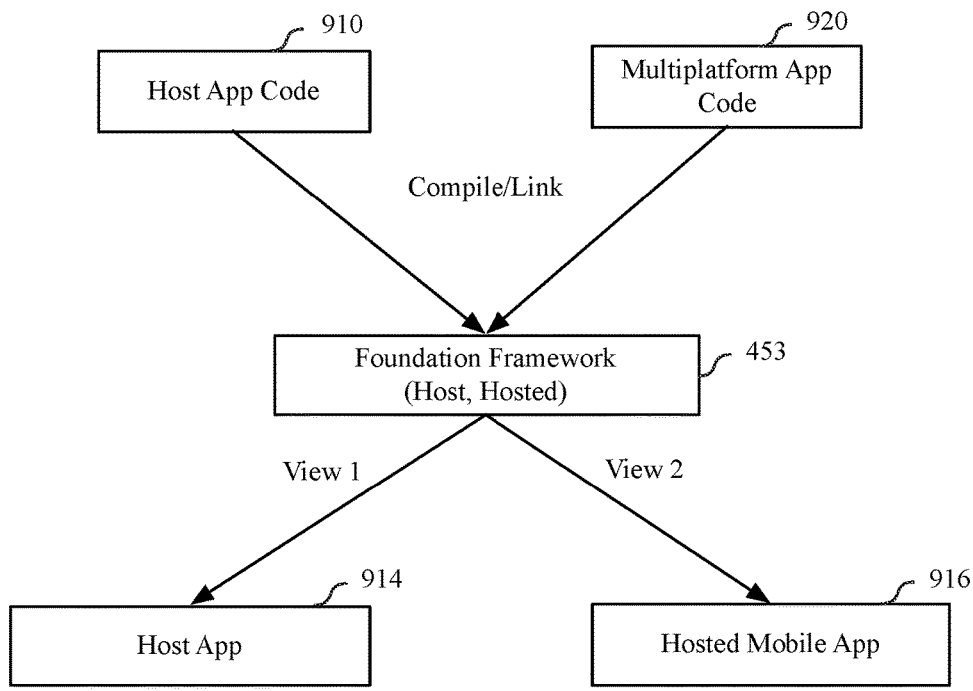
FIG. 9A-9B illustrate platform differentiation and conflict detection, according to an embodiment.
Figure 9B:
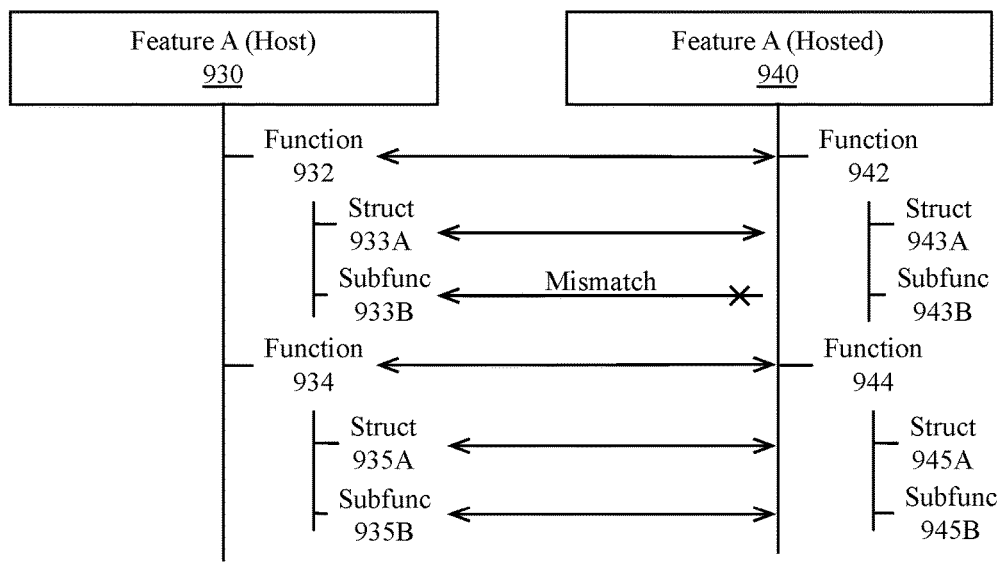

FIG. 9A-9B illustrate platform differentiation and conflict detection, according to an embodiment. FIG. 9A illustrates a build tree for multi-OS program code, according to an embodiment. FIG. 9B illustrates conflict detection for a multi-OS framework. The illustrated concepts apply to a multi-OS build environment, according to one embodiment. The multi-OS build environment, in one embodiment, is an integrated development environment that includes a modular compiler capable of executing multiple front-end and back-end compilers to compile and link program code for execution on a variety of target platforms. The integrated development environment can also include a simulator for mobile applications, such as the mobile application simulator 420 as in FIG. 4A-4B.

As shown in FIG. 9A, host application code 910 and multiplatform application code 920 can each be compiled and linked with the same framework (e.g., foundation framework 453), where the framework can present different views based on the build target specified for the framework. For example, a first view of the framework is compiled into a host application 914, while a second view of the application can be compiled into a hosted mobile application 916. The build contract that a framework provides to a client application should be invariant between the different views of the framework. While a specific framework is provided for exemplary purposes, the concepts illustrated and described apply to all multi-OS libraries and frameworks, where the same framework can be used to build applications for execution on multiple platforms.

Build-time analysis can be performed in one embodiment to compare features to determine if differing views of the same feature are sufficiently different to violate the build contract associated with the feature. The build contract for a feature defines the API and application binary interface (ABI) for a library or framework. A client of the framework can expect, particularly for dynamic libraries, that interfaces between the client and the libraries of the framework will remain consistent between compatible versions. Where multiple views of the same framework can be presented to client application, additional analysis may be performed to detect and identify inconsistencies that may arise between views during framework development. Particularly, it may be possible for differences to exist between views that cause ABI incompatibilities even where API compatibility is not affected. Such changes may be particularly difficult for a developer to identify without the assistance of the build system.

A build system can include one or more tools to perform feature-by-feature analysis of frameworks at build time. FIG. 9B illustrates analysis for an exemplary feature A from a host platform view 930 and a hosted platform view 940. The host platform view 930 of feature A can have a first function 932 that includes a structure 933A and a sub-function 933B. The host platform view 930 can additionally include a second function 934 having a structure 935A and a sub-function 935B. Additional functions, sub-functions, and data structures can also be present. The hosted platform view 940 for hosted mobile applications can include the same functions and data structures. For example, the hosted platform view 940 of feature A can include a third function 942, which is a variant of the first function 932. The third function 942 can include a structure 943A and a sub-function 943B. The hosted platform view 940 can additionally include a fourth function 944, which is a variant of the second function 934. The fourth function 944 can include a structure 945A and a sub-function 945B.

While the API of feature A is the same between views, changes may be introduced that can produce incompatibilities, such as ABI incompatibilities. In one embodiment a build time analysis is performed to scan the interface exposed for a framework to detect incompatibilities between the different platform views. For example, in one embodiment the build environment can scan header files to determine exposed symbols for a view of a framework. Additional scanning can be performed to compare function parameters and output data types. In one embodiment, a signature can be determined for functions and data within a framework for each view. The signature can include data such as, but is not limited to function parameters and the data type of those parameters, a return value and data type for the return value, exceptions that may be thrown or passed back, and information regarding the availability of a method or data (e.g., public, static, etc.). In one embodiment, a function signature can be determined based on a prototype declaration within a header file. Signatures for exported data structures can also be determined, including but not limited to signatures for structures, classes, and enumerations.

Figure 10A:
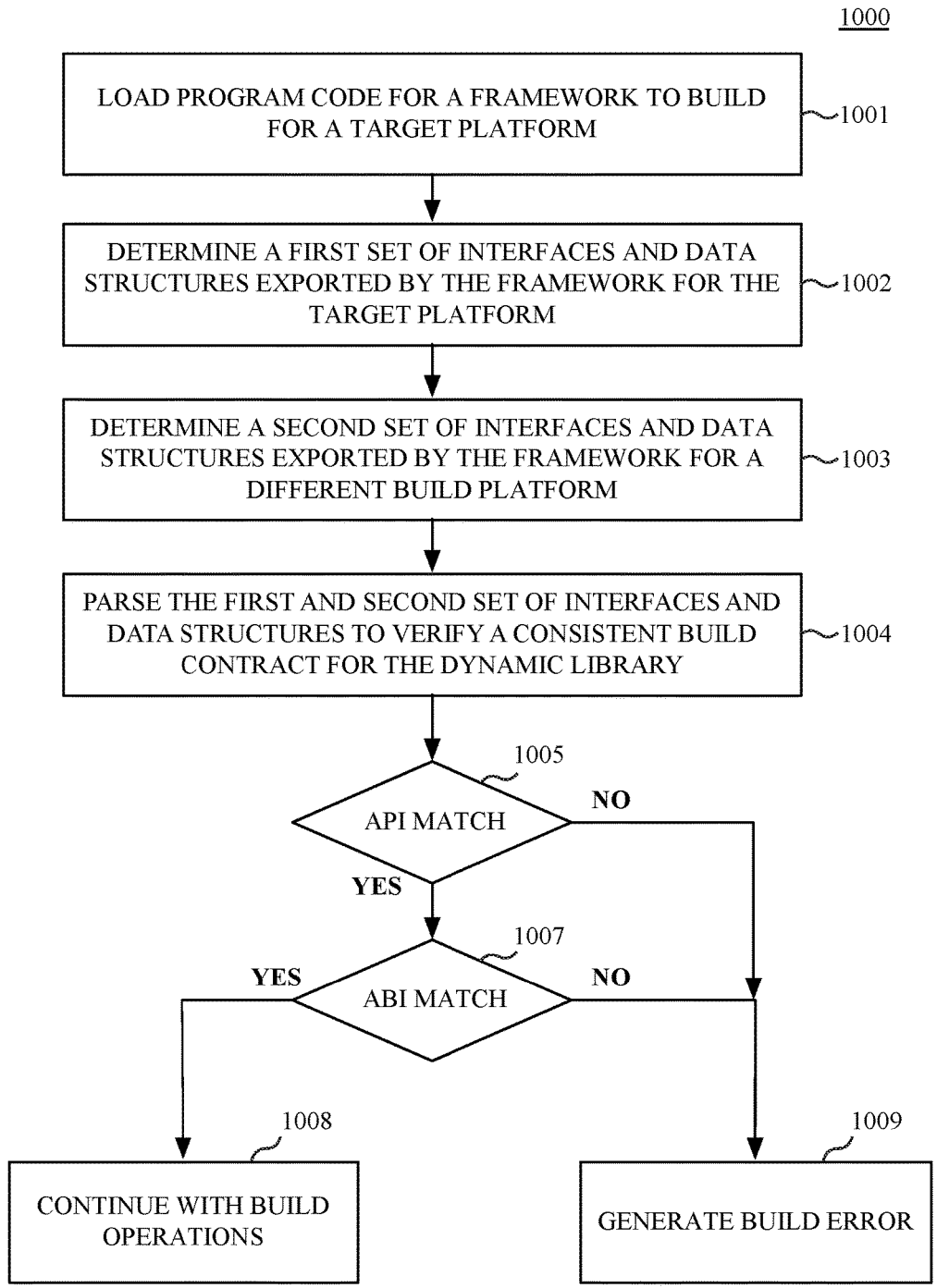
FIG. 10A-10B are flow diagrams of methods to prevent framework conflicts for multi-OS applications.
Figure 10B:
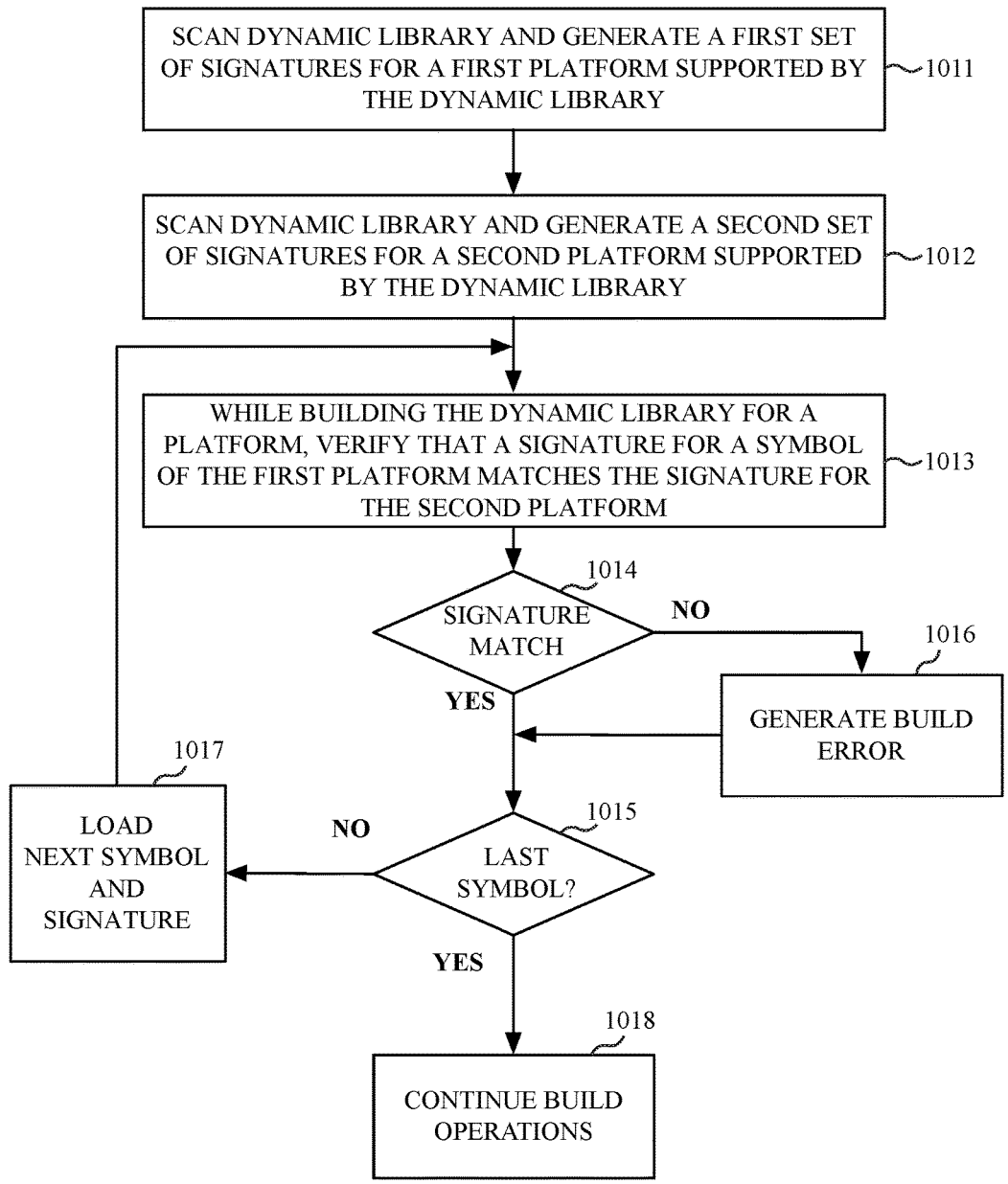

FIG. 10A-10B are flow diagrams of methods 1000, 1010 to prevent framework conflicts for multi-OS applications. FIG. 10A illustrates a method 1000 at a high-level to verify a build contract for a framework across multiple build targets. FIG. 10B illustrates a method 1010 of matching signatures for symbols exported by a dynamic library. Each method can be performed by a toolset of a multi-OS build system that can be used to build libraries and applications for execution on multiple operating systems and platforms. An exemplary build system can be found in versions of the XCode developer software system provided by Apple Inc. of Cupertino Calif.

As shown in FIG. 10A, method 1000 includes operation 1001 to load program code for a framework to build for a target platform. The target platform can be provided as input to the build tools that implement method 1000. Target platforms can include a host platform, such as a desktop or laptop computing system, or a mobile platform, such as a smartphone, tablet computing device. Additional platforms can also include a wearable electronic device, or television set top device, although the additional platforms can be integrated into the mobile platforms in some embodiments. The framework can include one or more dynamic libraries that provide a suite of functionality to client applications. Each dynamic library in the framework can be analyzed.

Method 1000 additionally includes operation 1002 to determine a set of interfaces and data structures exported by the framework for the target platform. The interfaces and data structures can be exported as symbols that can be referenced by client programs of the framework. Such symbols can be generated by a build environment during a build process.

Method 1000 additionally includes operation 1003 to determine a second set of interfaces and data structures exported by the framework for a different build platform. Method 1000 then proceeds to operation 1004, which parses the first and second set of interfaces and data structures to verify a consistent build contract for the dynamic library for the different build platforms. Verifying the build contract can include, in one embodiment, operation 1005 to verify an API match to the build contract and operation 1007 to verifying an ABI match to the build contract. If either the API or the ABI mismatch, method 1000 proceeds to operation 1009 to generate a build error. If both match, the method 1000 continues with the build operations for the program code, which are performed by operation 1008. The build operations for the program code include compiling the program code into object files and linking the various object files into a dynamic library.

As shown in FIG. 10B, method 1010 includes operation 1011 to scan a dynamic library and generate a first set of signatures for a first platform supported by the dynamic library. Method 1010 additionally includes operation 1012, which scans the dynamic library and generates a second set of signatures for a second platform supported by the dynamic library. Signature generation can include generating a signature based on data including inputs, outputs, and data types for each symbol exported by the dynamic library. In one embodiment, signature generation can vary based on the type of program code under analysis. However, the data used to analyze a given type of program code (e.g., function, method, class, structure) is consistent for a given type.

Method 1010 additionally includes operation 1013 to verify that a signature for a symbol of the first platform matches the signature for the second platform. This verification can be performed while building the dynamic library. As shown at block 1014, if the signatures for the symbol do not match, method 1010 proceeds to operation 1016 generate a build error. If the signature matches at block 1014, method 1010 proceeds to operation 1015 to determine if the analyzed symbol is the last symbol for the dynamic library. If the analyzed symbol is the last symbol, the method 1010 can continue other build operations at block 1018. If the analyzed symbol is not the last symbol for the dynamic library at 1015, method 1010 proceeds to operation 1017 to load the next symbol and return to operation 1013. It can also be possible for a build system to scan dynamic library and generate a set of signatures for each platform supported by the dynamic library. Those signatures can be stored for later use and used to determine whether any unexpected changes to the API or ABI for a dynamic library have been introduced into a build. Changes can be reviewed to determine if those changes are expected and consistent with intended design changes.

Exemplary data used to prevent conflicts is shown in Table 1 below.

TABLE 1

Dynamic Library Analysis exports:
   availability:
      install-name: /System/Library/Frameworks/Simple.framework/
Versions/A/Simple
     current-version: 1.2.3
     compatibility-version: 1.2.0
     arch: [ x86_64 ]

| | |
|---|---|
| Platform 1 Symbols: | [A, Base, ExternalManagedObject, Simple, SubClass] |
| Platform 1 Signatures: | [0x00AF, 0x00A1, 0x00AB, 0x00F2, 0x008B] |
| Platform 2 Symbols: | [A, Base, ExternalManagedObject, Simple, SubClass] |
| Platform 2 Signatures: | [0x00AF, 0x00A1, 0x00AB, 0x00F2, 0x008B] |

The conflict analysis data shown above is exemplary and not limiting as to all embodiments. The dynamic library analysis can be performed using a data structure stored in memory or can be based on a file that is generated during the build process for the dynamic library. In one embodiment, a build architecture is indicated for the library. In one embodiment, a current version and a compatibility version can be recorded, where the current version can be examined relative to an expected compatibility version. Symbols within the dynamic library can be compared across platforms, along with signatures for those symbols. In one embodiment, the signatures can be a numeric value that is generated based on a set of factors associated with each symbol. While the signature is illustrated as a numerical value, the signature can also take other forms, such a string or an alphanumeric value. The factors used to generate the signature can include function or method parameters and the data type of those parameters, a return value, and data type for the return value of the function or method. Signatures can also be based on exceptions that may be thrown or passed back, and information regarding the availability of a method or data (e.g., public, static, etc.). In one embodiment, a function signature can be determined based on a prototype declaration within a header file. Signatures for exported data structures can also be determined, including but not limited to signatures for structures, classes, and enumerations.

Exemplary API Interactions

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 11:
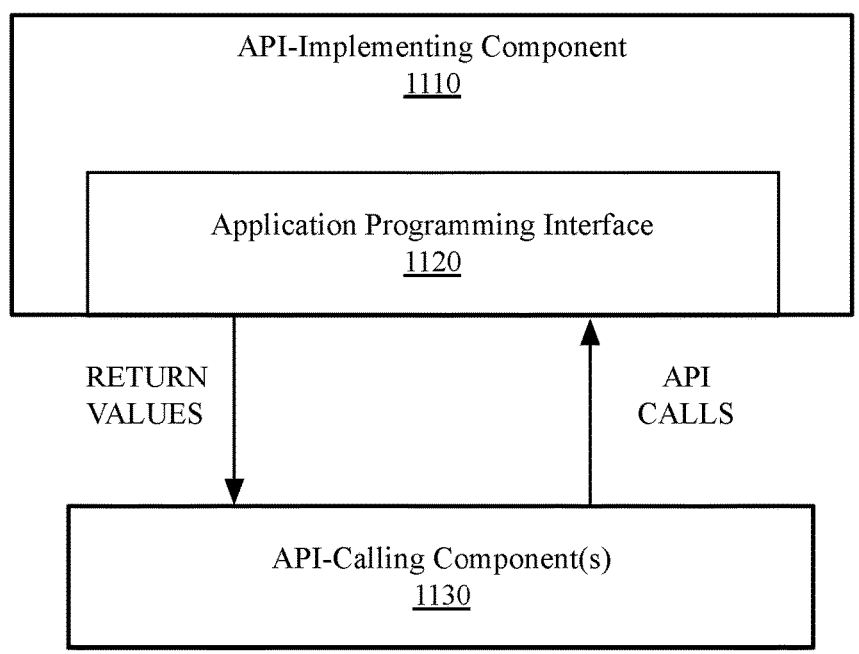
FIG. 11 is a block diagram illustrating an exemplary API architecture, which may be used in some embodiments of the invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software, or other module) that implements the API 1120. Any of the libraries or frameworks described herein can be API-implementing components 1110.

The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software, or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 can include additional functions, methods, classes, data structures, and/or other features that are not specified through the API 1120 and are not available to the API-calling component 1130. It should be understood that the API-calling component 1130 can be on the same system as the API-implementing component 1110 or may be located remotely and accesses the API-implementing component 1110 using the API 1120 over a network. For example, an API implemented over the IPC link 223 of FIG. 2 can be implemented using remote procedure calls over a network. While FIG. 11 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 12A:
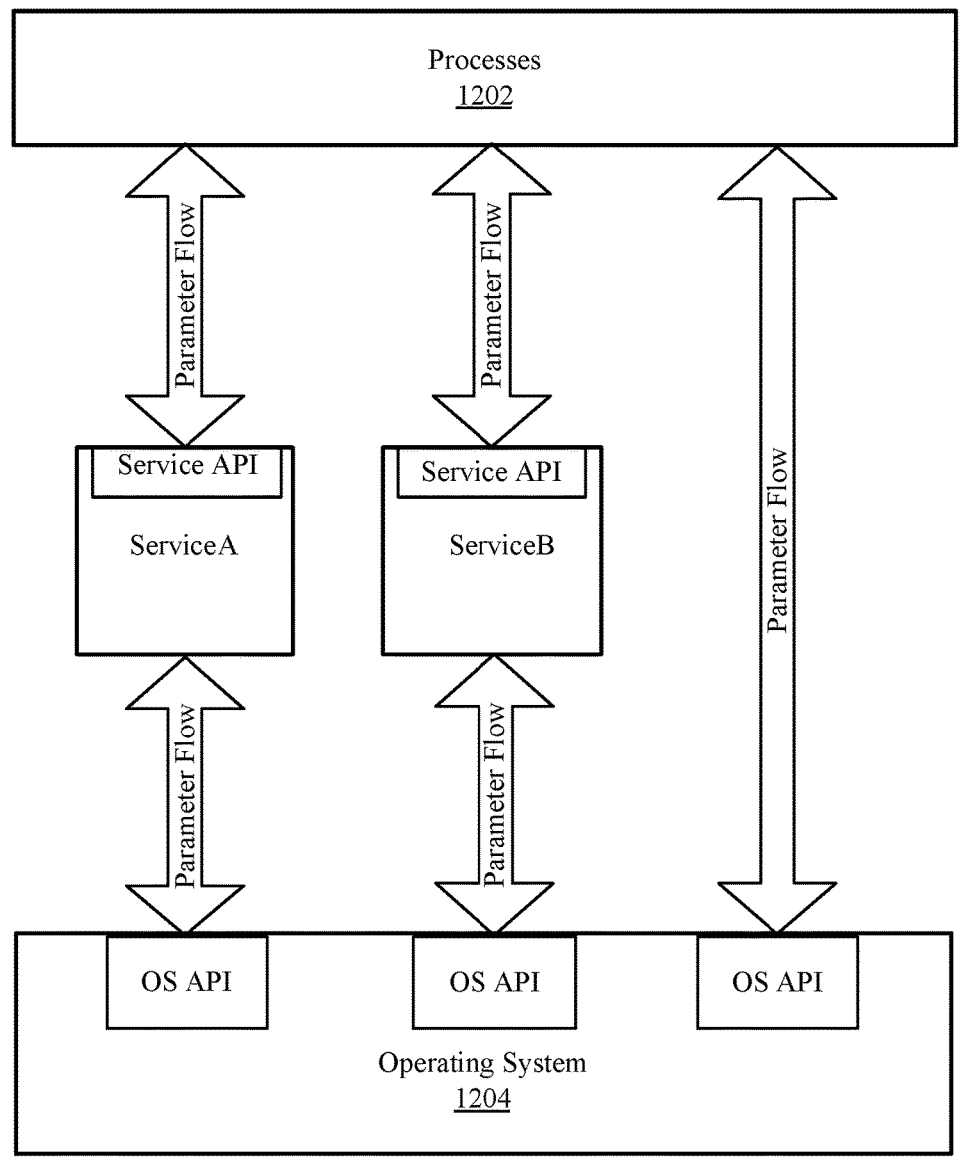
FIG. 12A-12B are block diagrams of exemplary API software stacks, according to embodiments.
Figure 12B:
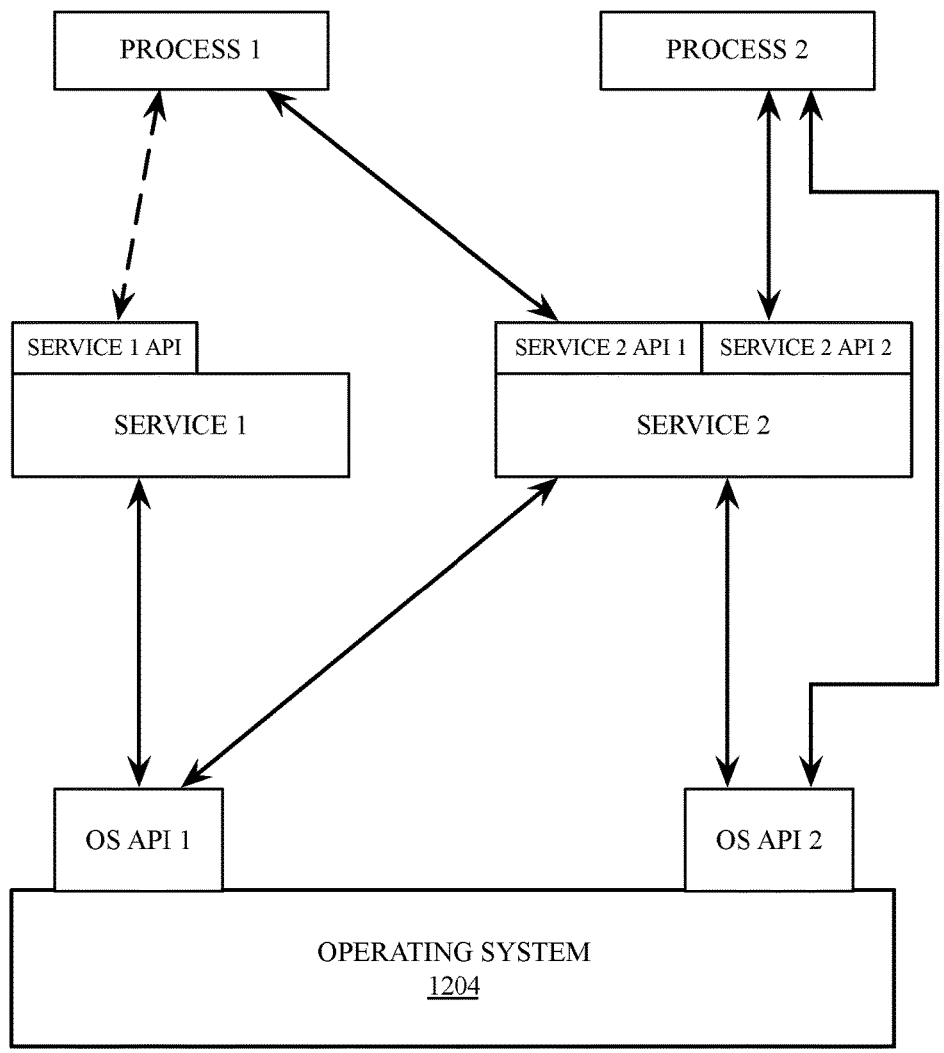

FIG. 12A-12B are block diagrams of exemplary API software stacks 1200, 1210, according to embodiments. FIG. 12A shows an exemplary API software stack 1200 in which processes 1202 can make calls to Service A or Service B using Service API and to Operating System 1204 using an OS API. Additionally, Service A and Service B can make calls to Operating System 1204 using several OS APIs.

FIG. 12B shows an exemplary API software stack 1210 including Process 1, Process 2, Service 1, Service 2, and Operating System 1204. As illustrated, Service 2 has two APIs, one of which (Service 2 API 1) receives calls from and returns values to Process 1 and the other (Service 2 API 2) receives calls from and returns values to Process 2. Service 1 (which can be, for example, a software library) makes calls to and receives returned values from OS API 1, and Service 2 (which can be, for example, a software library) makes calls to and receives returned values from both OS API 1 and OS API 2. Process 2 makes calls to and receives returned values from OS API 2.

Additional Exemplary Computing Devices

Figure 13:
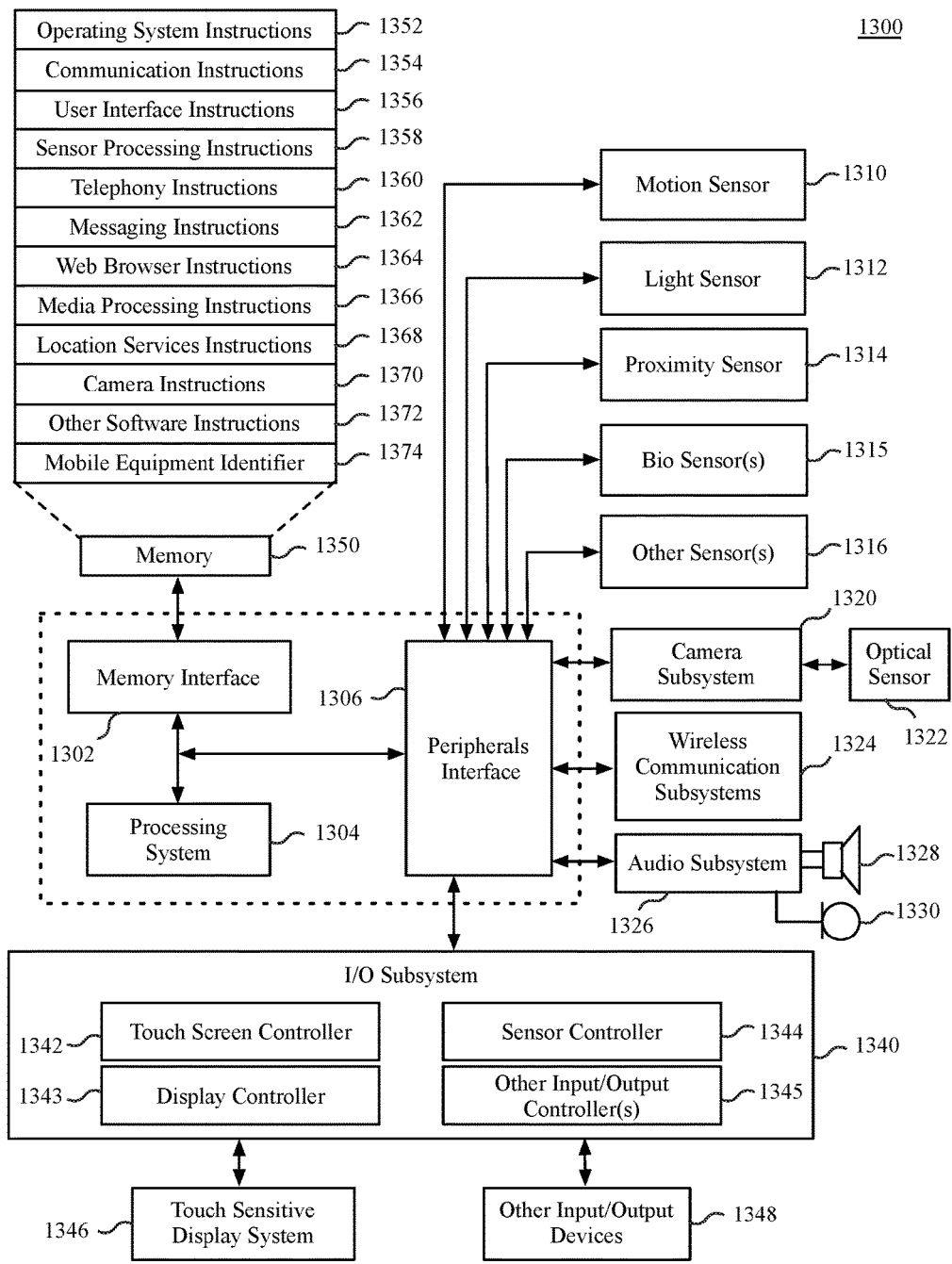
FIG. 13 is a block diagram of a device architecture for a mobile or embedded device, according to an embodiment.

FIG. 13 is a block diagram of a device architecture 1300 for a mobile or embedded device, according to an embodiment. The device architecture 1300 includes a memory interface 1302, a processing system 1304 including one or more data processors, image processors and/or graphics processing units, and a peripherals interface 1306. The various components can be coupled by one or more communication buses or signal lines. The various components can be separate logical components or devices or can be integrated in one or more integrated circuits, such as in a system on a chip integrated circuit.

The memory interface 1302 can be coupled to memory 1350, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate the mobile device functionality. One or more biometric sensor(s) 1315 may also be present, such as a fingerprint scanner for fingerprint recognition or an image sensor for facial recognition. Other sensors 1316 can also be connected to the peripherals interface 1306, such as a positioning system (e.g., GPS receiver), a temperature sensor, or other sensing device, to facilitate related functionalities. A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1324, which can include radio frequency receivers and transmitters and/or optical (e.g., infrared) receivers and transmitters. The specific design and implementation of the wireless communication subsystems 1324 can depend on the communication network(s) over which a mobile device is intended to operate. For example, a mobile device including the illustrated device architecture 1300 can include wireless communication subsystems 1324 designed to operate over a GSM network, a CDMA network, an LTE network, a Wi-Fi network, a Bluetooth network, or any other wireless network. In particular, the wireless communication subsystems 1324 can provide a communications mechanism over which a media playback application can retrieve resources from a remote media server or scheduled events from a remote calendar or event server.

An audio subsystem 1326 can be coupled to a speaker 1328 and a microphone 1330 to facilitate voice-enabled functions, such as voice recognition, voice replication, digital recording, and telephony functions. In smart media devices described herein, the audio subsystem 1326 can be a high-quality audio system including support for virtual surround sound.

The I/O subsystem 1340 can include a touch screen controller 1342 and/or other input controller(s) 1345. For computing devices including a display device, the touch screen controller 1342 can be coupled to a touch sensitive display system 1346 (e.g., touch-screen). The touch sensitive display system 1346 and touch screen controller 1342 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1346. Display output for the touch sensitive display system 1346 can be generated by a display controller 1343. In one embodiment, the display controller 1343 can provide frame data to the touch sensitive display system 1346 at a variable frame rate.

In one embodiment, a sensor controller 1344 is included to monitor, control, and/or processes data received from one or more of the motion sensor 1310, light sensor 1312, proximity sensor 1314, or other sensors 1316. The sensor controller 1344 can include logic to interpret sensor data to determine the occurrence of one of more motion events or activities by analysis of the sensor data from the sensors.

In one embodiment, the I/O subsystem 1340 includes other input controller(s) 1345 that can be coupled to other input/control devices 1348, such as one or more buttons, rocker switches, thumb-wheel, infrared port, USB port, and/or a pointer device such as a stylus, or control devices such as an up/down button for volume control of the speaker 1328 and/or the microphone 1330.

In one embodiment, the memory 1350 coupled to the memory interface 1302 can store instructions for an operating system 1352, including portable operating system interface (POSIX) compliant and non-compliant operating system or an embedded operating system. The operating system 1352 may include instructions for handling basic system services and for performing hardware dependent tasks. In some implementations, the operating system 1352 can be a kernel.

The memory 1350 can also store communication instructions 1354 to facilitate communicating with one or more additional devices, one or more computers and/or one or more servers, for example, to retrieve web resources from remote web servers. The memory 1350 can also include user interface instructions 1356, including graphical user interface instructions to facilitate graphic user interface processing.

Additionally, the memory 1350 can store sensor processing instructions 1358 to facilitate sensor-related processing and functions; telephony instructions 1360 to facilitate telephone-related processes and functions; messaging instructions 1362 to facilitate electronic-messaging related processes and functions; web browser instructions 1364 to facilitate web browsing-related processes and functions; media processing instructions 1366 to facilitate media processing-related processes and functions; location services instructions including GPS and/or navigation instructions 1368 and Wi-Fi based location instructions to facilitate location based functionality; camera instructions 1370 to facilitate camera-related processes and functions; and/or other software instructions 1372 to facilitate other processes and functions, e.g., security processes and functions, and processes and functions related to the systems. The memory 1350 may also store other software instructions such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively. A mobile equipment identifier, such as an International Mobile Equipment Identity (IMEI) 1374 or a similar hardware identifier can also be stored in memory 1350.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions may be implemented in hardware and/or in software, including in one or more signal processing and/or application specific integrated circuits.

Figure 14:
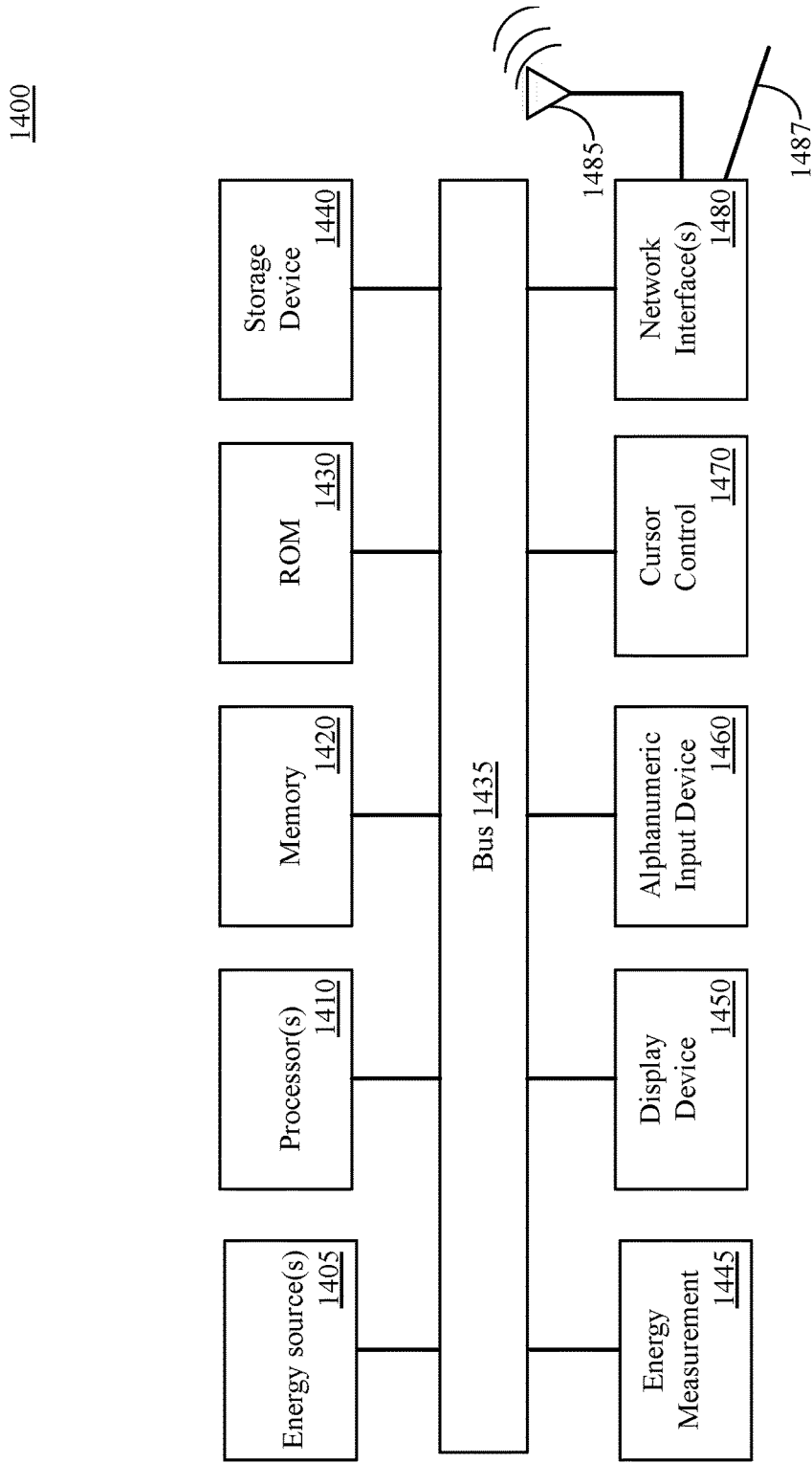
FIG. 14 is a block diagram of a computing system, according to an embodiment.

FIG. 14 is a block diagram of a computing system 1400, according to an embodiment. The illustrated computing system 1400 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1400 can be used to provide the computing device and/or a server device to which the computing device may connect.

The computing system 1400 includes bus 1435 or other communication device to communicate information, and processor(s) 1410 coupled to bus 1435 that may process information. While the computing system 1400 is illustrated with a single processor, the computing system 1400 may include multiple processors and/or co-processors. The computing system 1400 further may include random access memory 1420 (RAM) or other dynamic storage device coupled to the bus 1435. The memory 1420 may store information and instructions that may be executed by processor(s) 1410. Main memory 1420 may also be used to store temporary variables or other intermediate information during execution of instructions by the processor(s) 1410.

The computing system 1400 may also include read only memory (ROM) 1430 and/or another data storage device 1440 coupled to the bus 1435 that may store information and instructions for the processor(s) 1410. The data storage device 1440 can be or include a variety of storage devices, such as a flash memory device, a magnetic disk, or an optical disc and may be coupled to computing system 1400 via the bus 1435 or via a remote peripheral interface.

The computing system 1400 may also be coupled, via the bus 1435, to a display device 1450 to display information to a user. The computing system 1400 can also include an alphanumeric input device 1460, including alphanumeric and other keys, which may be coupled to bus 1435 to communicate information and command selections to processor(s) 1410. Another type of user input device includes a cursor control 1470 device, such as a touchpad, a mouse, a trackball, or cursor direction keys to communicate direction information and command selections to processor(s) 1410 and to control cursor movement on the display device 1450. The computing system 1400 may also receive user input from a remote device that is communicatively coupled via one or more network interface(s) 1480.

The computing system 1400 further may include one or more network interface(s) 1480 to provide access to a network, such as a local area network. The network interface(s) 1480 may include, for example, a wireless network interface having antenna 1485, which may represent one or more antenna(e). The computing system 1400 can include multiple wireless network interfaces such as a combination of Wi-Fi, Bluetooth®, near field communication (NFC), and/or cellular telephony interfaces. The network interface(s) 1480 may also include, for example, a wired network interface to communicate with remote devices via network cable 1487, which may be, for example, an Ethernet cable, a coaxial cable, a fiber optic cable, a serial cable, or a parallel cable.

In one embodiment, the network interface(s) 1480 may provide access to a local area network, for example, by conforming to IEEE 1102.14 b and/or IEEE 1102.14 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1480 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1400 can further include one or more energy sources 1405 and one or more energy measurement systems 1445. Energy sources 1405 can include an AC/DC adapter coupled to an external power source, one or more batteries, one or more charge storage devices, a USB charger, or other energy source. Energy measurement systems include at least one voltage or amperage measuring device that can measure energy consumed by the computing system 1400 during a predetermined period of time. Additionally, one or more energy measurement systems can be included that measure, e.g., energy consumed by a display device, cooling subsystem, Wi-Fi subsystem, or other frequently used or high-energy consumption subsystem.

It will be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide for system and methods to enable an operating environment that supports multi-OS applications. Some embodiments provide techniques to enable frameworks to load within a multi-OS operating environment. Some embodiments provide techniques to prevent framework conflicts within a multi-OS operating environment. Some embodiments provide for techniques to enable an operating environment that supports multi-OS applications.

One embodiment provides for a method for enabling runtime platform determination for a dynamic library, where the method comprises dynamically loading an instance of a library file on a host platform including multiple execution environments, the library file configured to be loaded by two or more of the multiple execution environments on the host platform, receiving a query via a system programming interface to determine an execution environment for which the instance of the library file is loaded, reading a load command for an executable for which the instance of the library file is loaded, determining the execution environment for the instance of the library file based on the execution environment for the executable, and responding to the query to indicate the execution environment for which the instance of the library file is loaded.

One embodiment provides for a non-transitory machine-readable medium storing instructions which, when executed, cause one or more processors to perform operations of the method that enables runtime platform determination for a dynamic library as described herein.

One embodiment provides for a data processing system comprising a memory to store instructions for execution and one or more processors to execute instructions stored in memory, the instructions to cause the one or more processors to dynamically load an instance of a library file on the host platform, the library file configured to be loaded by two or more of the multiple execution environments on the host platform. The data processing system can additionally receive a query via a system programming interface to determine an execution environment for which the instance of the library file is loaded, read a first load command for an executable for which the instance of the library file is loaded, the load command to specify an execution environment for which the executable is compiled, determine the execution environment for the instance of the library file based on the execution environment for the executable, and respond to the query to indicate the execution environment for which the instance of the library file is loaded.

One embodiment provides for a non-transitory machine-readable medium storing instructions which, when executed, cause one or more processors to perform operations to annotate compiled code for a dynamic library, the operations comprising parsing a set of object files to generate a graph of code and data for each object file, group elements from the graphs of code and data into a master graph of elements, and generating an annotated output file including compiled code for the dynamic library, the annotated output file having a header and a first set of load commands, the first set of load commands to specify multiple target platforms for the dynamic library.

In a further embodiment, the operations additionally comprise grouping elements from the graphs of code and data into a master graph of elements and resolving references between elements within and across the set of object files. The multiple target platforms can include a host platform and a hosted mobile application platform. The host platform can be a laptop computing device or a desktop computing device. The hosted mobile application platform can also be a laptop computing device or a desktop computing device. The host platform and the hosted mobile application platform can execute on the same computing device. In one embodiment, the multiple target platforms additionally include a simulator platform to simulate a mobile electronic device.

In one embodiment, the non-transitory machine readable medium additionally includes instructions to cause the one or more processors to perform operations comprising, while launching an application for execution on a computing system, reading a second set of load commands within the application, wherein the second set of load commands identifies the dynamic library and a platform of the application, parsing the first set of load commands within the dynamic library to determine a target platform for the dynamic library, and loading the dynamic library in response to determining that the target platform for the dynamic library is compatible with the target platform of the application, wherein the target platform of the application is one of multiple platforms on the computing system.

One embodiment provides for a data processing system comprising a memory to store instructions for execution and one or more processors to execute instructions stored in memory, the instructions to cause the one or more processors to parse a set of object files to generate a graph of code and data for each object file, group elements from the graphs of code and data into a master graph of elements, and generate an annotated output file including compiled code for the dynamic library, the annotated output file having a header and a first set of load commands, the first set of load commands to specify multiple target platforms for the dynamic library.

One embodiment provides for a method of loading a dynamic library on a multi-OS computing system, the method comprising, while launching an application for execution on a computing system, reading a second set of load commands within the application, wherein the second set of load commands identifies the dynamic library and a target platform of the application; parsing the first set of load commands within the dynamic library to determine a target platform for the dynamic library; and loading the dynamic library in response to determining that the target platform for the dynamic library is compatible with the target platform of the application, wherein the target platform of the application is one of multiple platforms on the computing system.

One embodiment provides for a non-transitory machine-readable medium storing instructions which, when executed, cause one or more processors of a data processing system to perform operations to detect conflicts during a build process for a dynamic library, the operations comprising loading program code for the dynamic library to build for a first platform, determining a set of interfaces and data structures exported by the dynamic library for the first platform, determining a set of interfaces and data structures exported by the dynamic library for a second platform, parsing the set of interfaces and data structures to verify consistency of a build contract for the dynamic library, and generating a build error during a build process for the dynamic library upon detecting an inconsistent build contract, the build contract specifying at least an application binary interface (ABI) for the dynamic library.

In a further embodiment, detecting an inconsistent build contract includes detecting a mismatch between the ABI for the dynamic library when built for the first platform and the ABI for the dynamic library when built for the second platform. Additionally, detecting an inconsistent build contract additionally includes determining whether an application programming interface (API) exported for the dynamic library for the first platform matches an application programming interface exported for the dynamic library for the second platform. In one embodiment the first platform is a target build platform for the dynamic library during a build process for the dynamic library. In one embodiment the dynamic library is one of multiple dynamic libraries of an application framework.

In one embodiment, determining a set of interfaces and data structures exported by the dynamic library for the first platform includes scanning the dynamic library to generate a first set of signatures for the first platform and a second set of signatures for the second platform. Additionally, detecting an inconsistent build contract can include determining that a signature for a symbol exported by the dynamic library for the first platform is a mismatch for the signature for the symbol exported by the dynamic library for the second platform, where the signature is generated based in part on a data type associated with the symbol.

One embodiment provides for a method of detecting conflicts during a build process for a dynamic library. The method comprises loading program code for the dynamic library to build for a first platform, determining a set of interfaces and data structures exported by the dynamic library for the first platform, determining a set of interfaces and data structures exported by the dynamic library for a second platform, parsing the set of interfaces and data structures to verify consistency of a build contract for the dynamic library, and generating a build error during a build process for the dynamic library upon detecting an inconsistent build contract, the build contract specifying at least an ABI for the dynamic library.

One embodiment provides for a data processing system comprising a memory to store instructions for execution and one or more processors to execute instructions stored in memory. The instructions, when executed, can cause the one or more processors to load program code for a dynamic library to build for a first platform, determine a set of interfaces and data structures exported by the dynamic library for the first platform, determine a set of interfaces and data structures exported by the dynamic library for a second platform, parse the set of interfaces and data structures to verify consistency of a build contract for the dynamic library, and generate a build error during a build process for the dynamic library upon detection of an inconsistent build contract, the build contract to specify at least an ABI for the dynamic library. The data processing system can also be configured to perform any method described herein. The data processing system can also be configured to execute instructions embodied in a machine readable medium, where the instructions perform operations described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A non-transitory machine-readable medium storing instructions which, when executed, cause one or more processors of a data processing system to perform operations to detect conflicts during a build process for a dynamic library, the operations comprising:
loading program code for the dynamic library to build for a first platform;
determining a set of interfaces and data structures exported by the dynamic library for the first platform;
determining a set of interfaces and data structures exported by the dynamic library for a second platform;
parsing the set of interfaces and data structures to verify consistency of a build contract for the dynamic library; and
generating a build error during a build process for the dynamic library upon detecting an inconsistent build contract, the build contract specifying at least an application binary interface (ABI) for the dynamic library, wherein detecting an inconsistent build contract includes detecting a mismatch between the ABI for the dynamic library when built for the first platform and the ABI for the dynamic library when built for the second platform and determining whether an application programming interface (API) exported for the dynamic library for the first platform matches the API exported for the dynamic library for the second platform.

2. The non-transitory machine-readable medium as in claim 1, wherein the first platform is a target build platform for the dynamic library during a build process for the dynamic library.

3. The non-transitory machine-readable medium as in claim 1, wherein the dynamic library is one of multiple dynamic libraries of an application framework.

4. The non-transitory machine-readable medium as in claim 1, wherein determining a set of interfaces and data structures exported by the dynamic library for the first platform includes scanning the dynamic library to generate a first set of signatures for the first platform.

5. The non-transitory machine-readable medium as in claim 4, wherein determining a set of interfaces and data structures exported by the dynamic library for the second platform includes scanning the dynamic library to generate a second set of signatures for second first platform.

6. The non-transitory machine-readable medium as in claim 5, wherein detecting an inconsistent build contract includes determining that a signature for a symbol exported by the dynamic library for the first platform is a mismatch for the signature for the symbol exported by the dynamic library for the second platform, wherein the signature is generated based in part on a data type associated with the symbol.

7. The non-transitory machine-readable medium as in claim 1, wherein the first platform is a mobile platform associated with a smartphone device or tablet computer and the second platform is associated with a desktop or laptop computing system.

8. The non-transitory machine-readable medium as in claim 7, wherein the second platform is configured to host execution of applications associated with the first platform.

9. A data processing system comprising:
a memory to store instructions for execution;
one or more processors to execute instructions stored in memory, the instructions to cause the one or more processors to:
load program code for a dynamic library to build for a first platform;
determine a set of interfaces and data structures exported by the dynamic library for the first platform;
determine a set of interfaces and data structures exported by the dynamic library for a second platform;
parse the set of interfaces and data structures to verify consistency of a build contract for the dynamic library; and
generate a build error during a build process for the dynamic library upon detection of an inconsistent build contract, the build contract to specify at least an application binary interface (ABI) for the dynamic library, wherein detection of the inconsistent build contract includes detection of a mismatch between the ABI for the dynamic library when built for the first platform and the ABI for the dynamic library when built for the second platform and determining whether an application programming interface (API) exported for the dynamic library for the first platform matches the API exported for the dynamic library for the second platform.

10. The data processing system as in claim 9, wherein the first platform is a target build platform for the dynamic library during a build process for the dynamic library and the dynamic library is one of multiple dynamic libraries of an application framework.

11. The data processing system as in claim 9, wherein to determine the set of interfaces and data structures exported by the dynamic library for the first platform includes to scan the dynamic library to generate a first set of signatures for the first platform and to determine the set of interfaces and data structures exported by the dynamic library for the second platform includes to scan the dynamic library to generate a second set of signatures for the first platform.

12. The data processing system as in claim 11, wherein detecting an inconsistent build contract includes to determine that a signature for a symbol exported by the dynamic library for the first platform is a mismatch for the signature for the symbol exported by the dynamic library for the second platform.

13. The data processing system as in claim 12, the signature for the symbol exported by the dynamic library to be generated based in part on a data type associated with the symbol.

14. A data processing system as in claim 9, wherein the first platform is a mobile platform associated with a smartphone device or tablet computer and the second platform is associated with a desktop or laptop computing system.

15. A data processing system as in claim 14, wherein the second platform is configured to host execution of applications associated with the first platform.

16. A method of detecting conflicts during a build process for a dynamic library, the method comprising:
 loading program code for the dynamic library to build for a first platform;
 determining a set of interfaces and data structures exported by the dynamic library for the first platform;
 determining a set of interfaces and data structures exported by the dynamic library for a second platform;
 parsing the set of interfaces and data structures to verify consistency of a build contract for the dynamic library; and
 generating a build error during a build process for the dynamic library upon detecting an inconsistent build contract, the build contract specifying at least an application binary interface (ABI) for the dynamic library, wherein detecting an inconsistent build contract includes detecting a mismatch between the ABI and an application programming interface (API) for the dynamic library when built for the first platform compared to when the dynamic library is built for the second platform.

17. The method as in claim 16, wherein the dynamic library is one of multiple dynamic libraries of an application framework.

18. The method as in claim 16, wherein determining a set of interfaces and data structures exported by the dynamic library for the first platform includes scanning the dynamic library to generate a first set of signatures for the first platform and determining a set of interfaces and data structures exported by the dynamic library for the second platform includes scanning the dynamic library to generate a second set of signatures for second first platform.

19. The method as in claim 18, wherein detecting an inconsistent build contract includes determining that a signature for a symbol exported by the dynamic library for the first platform is a mismatch for the signature for the symbol exported by the dynamic library for the second platform, wherein the signature is generated based in part on a data type associated with the symbol.

20. The method as in claim 16, wherein the first platform is a mobile platform associated with a smartphone device or tablet computer, the second platform is associated with a desktop or laptop computing system, and the second platform is configured to host execution of applications associated with the first platform.

* * * * *

UNITED STATES PATENT AND TRADEMARK OFFICE
CERTIFICATE OF CORRECTION

PATENT NO. : 10,474,479 B1
APPLICATION NO. : 16/104818
DATED : November 12, 2019
INVENTOR(S) : Jeremiah R. Sequoia, Juergen Ributzka and Shengzhao Wu Page 1 of 1

It is certified that error appears in the above-identified patent and that said Letters Patent is hereby corrected as shown below:

In the Claims

Column 31,
Line 24, Claim 14, delete "A data processing system" and substitute therefore --The data processing system--.

Column 31,
Line 28, Claim 15, delete "A data processing system" and substitute therefore --The data processing system--.

Signed and Sealed this
Third Day of March, 2020

Andrei Iancu
*Director of the United States Patent and Trademark Office*